US011966196B2

(12) United States Patent
Toyoizumi

(10) Patent No.: US 11,966,196 B2
(45) Date of Patent: Apr. 23, 2024

(54) TONER AND METHOD FOR PRODUCING TONER

(71) Applicant: CANON KABUSHIKI KAISHA, Tokyo (JP)

(72) Inventor: Noritaka Toyoizumi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 17/205,702

(22) Filed: Mar. 18, 2021

(65) Prior Publication Data

US 2021/0302851 A1 Sep. 30, 2021

(30) Foreign Application Priority Data

Mar. 24, 2020 (JP) ................................ 2020-053066

(51) Int. Cl.
*G03G 9/087* (2006.01)
*G03G 9/08* (2006.01)

(52) U.S. Cl.
CPC ....... *G03G 9/08711* (2013.01); *G03G 9/0819* (2013.01); *G03G 9/08782* (2013.01)

(58) Field of Classification Search
None
See application file for complete search history.

(56) References Cited

U.S. PATENT DOCUMENTS 9,658,554 B2 5/2017 Kinumatsu et al.
9,690,223 B2 6/2017 Sakamoto
9,798,256 B2 10/2017 Kosaki et al.
9,798,262 B2 10/2017 Toyoizumi et al.
9,811,016 B2 11/2017 Aoki et al.
9,823,595 B2 11/2017 Toyoizumi et al.
9,857,713 B2 1/2018 Kosaki et al.
9,869,943 B2 1/2018 Aoki et al.
(Continued)

FOREIGN PATENT DOCUMENTS

EP 1 873 589 A2 1/2008
JP 2009-186640 A 8/2009
(Continued)

OTHER PUBLICATIONS

KR 20060097978 translation (Year: 2022).*
(Continued)

*Primary Examiner* — Peter L Vajda
(74) *Attorney, Agent, or Firm* — VENABLE LLP

(57) ABSTRACT

A toner comprising a toner particle that comprises a toner base particle and an outermost layer present on the toner base particle surface, the toner base particle containing a binder resin wherein a plurality of concave portions are formed on the toner particle surface, and when T (nm) is an average thickness of the outermost layer in analysis of a cross section of the toner particle as observed with TEM, and a (nm) is a long diameter, b (nm) is a short diameter and d (nm) is a depth of each of the concave portions, respectively, when the concave portions on the toner particle are measured by using SPM from an outermost surface of the outermost layer toward the toner particle center, when "n" represents a number of the concave portions that satisfy specific relationships per 1 $\mu m^2$ of the toner particle surface is 30 to 200.

8 Claims, 1 Drawing Sheet

(56) References Cited

U.S. PATENT DOCUMENTS

| | | | | |
|---|---|---|---|---|
| 10,409,180 | B2 | 9/2019 | Koji et al. | |
| 2008/0085461 | A1 | 4/2008 | Kurokawa | |
| 2015/0004540 | A1 | 1/2015 | Ozawa | |
| 2015/0030979 | A1* | 1/2015 | Miyamoto | G03G 9/0935 430/137.13 |
| 2016/0291495 | A1 | 10/2016 | Taguchi | |
| 2021/0026265 | A1 | 1/2021 | Kamikura et al. | |
| 2021/0026266 | A1 | 1/2021 | Toyoizumi et al. | |

FOREIGN PATENT DOCUMENTS

| | | | | |
|---|---|---|---|---|
| JP | 2015-11077 | A | 1/2015 | |
| JP | 2015-45844 | A | 3/2015 | |
| JP | 2015-141221 | A | 8/2015 | |
| JP | 2017-116712 | A | 6/2017 | |
| JP | 2018-205331 | A | 12/2018 | |
| JP | 2019-056897 | * | 4/2019 | G03G 9/09364 |
| KR | 20060097978 | * | 9/2006 | |
| WO | WO 2008-056519 | * | 5/2008 | G03G 9/093 |

OTHER PUBLICATIONS

Translation of WO 2008-056519.*
Translation of JP 2019-056897.*
U.S. Appl. No. 17/113,922, Takashi Matsui, filed Dec. 7, 2020,
U.S. Appl. No. 17/205,716, Naoya Isono, filed Mar. 18, 2021.

* cited by examiner

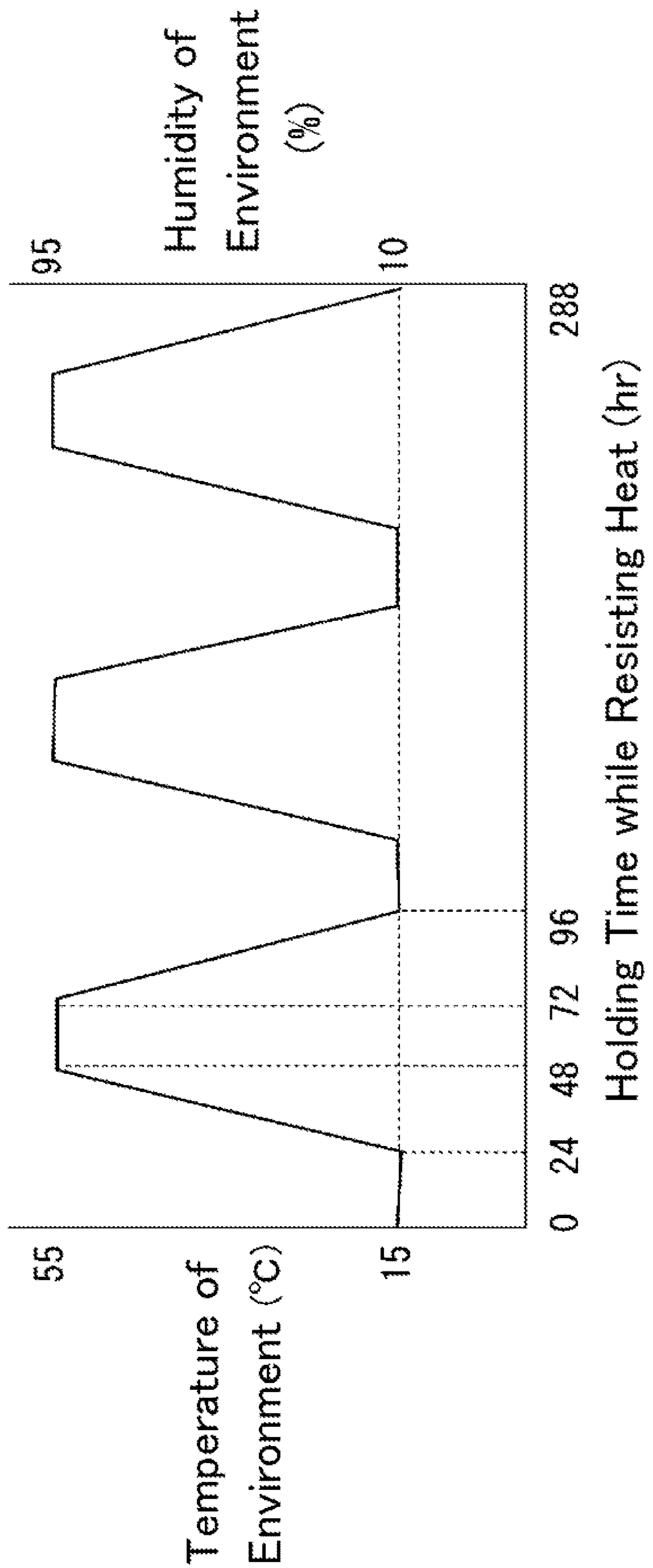
Humidity of Environment (%)
95
10
Temperature of Environment (°C)
55
15
0
24
48
72
96
288
Holding Time while Resisting Heat (hr)

TONER AND METHOD FOR PRODUCING TONER

BACKGROUND OF THE INVENTION

Field of the Invention

The present disclosure relates to a toner used in a recording method that utilizes an electrophotographic method, an electrostatic recording method, or a toner jet system recording method, and relates to a method for producing the toner.

Description of the Related Art

For energy conservation, efforts have been made with copiers and printers that use the electrophotographic method to reduce the amount of heat required by a fixing apparatus, i.e., to improve low-temperature fixability. In addition, for such devices there is demand for increases in the toner cartridge print yield in order to improve maintenance characteristics thereof by reducing the frequency of toner cartridge replacement. Accordingly, there is demand that the toner has, in addition to low-temperature fixability, a durability that provides a high-quality image stably even during long-term use. In addition to these, another demand that is placed on the toner is a storage stability such that the toner is unaffected even by severe environments in which the temperature and humidity undergo sharp variations after production and during transport to consumers.

In order to achieve these simultaneously, a toner with a core/shell structure, in which a shell resin covers the surface of a resin that forms the core of the toner, has been proposed.

Japanese Patent Application Laid-open No. 2015-11077 discloses a toner in which the surface of a toner core particle is coated by a shell layer formed of a resin that contains a unit derived from monomer for a thermosetting resin and a unit derived from a thermoplastic resin.

Japanese Patent Application Laid-open No. 2015-141221 discloses a toner that exhibits both an excellent fixing performance and an excellent storability. In this toner, a shell layer is formed on the surface of a toner core, and in this shell layer, a plurality of concave portions, which each expose the core, are formed.

Japanese Patent Application Laid-open No. 2017-116712 discloses a toner having an excellent storability and an excellent low-temperature fixability. This toner has a plurality of concave portions in the surface of a toner core, and has a shell layer that is present on the surface region of the toner core in both the regions within the concave portions and the regions outside of the concave portions.

SUMMARY OF THE INVENTION

However, as a result of investigations by the present inventor, it has been found that with regard to the toner described in Japanese Patent Application Laid-open No. 2015-11077, because the shell layer covers the entire surface of the toner particle, there is room for improvement in the low-temperature fixability. It has been also found that the ability to retain an external additive may decline during long-term use.

With regard to the toner described in Japanese Patent Application Laid-open No. 2015-141221, it is thought that the hardness distribution of the toner particle is controlled by the formation, in the shell layer, of a plurality of concave portions that expose the core. However, it has been found that the number of concave portions in the shell layer is insufficient and that there is room for improvement in the low-temperature fixability similarly to the toner described in Japanese Patent Application Laid-open No. 2015-11077. In addition, Japanese Patent Application Laid-open No. 2015-141221 does not address the storage stability in severe environments in which temperature and humidity undergo sharp variations.

It has been found that the toner described in Japanese Patent Application Laid-open No. 2017-116712 has neither a satisfactory storability nor a satisfactory durability. It has been found that in the toner according to Japanese Patent Application Laid-open No. 2017-116712, the shell layer is present in both the regions within the concave portions and regions outside of the concave portions, however, the coverage of the toner particle is not uniform and that many regions where the toner core is exposed over a broad range are present. This has been presumed to result in the unsatisfactory storability and unsatisfactory external additive retention. In addition, Japanese Patent Application Laid-open No. 2017-116712 does not address the storage stability in severe environments in which temperature and humidity undergo sharp variations.

Thus, as noted above, there has been a problem with regard to achieving simultaneously a low-temperature fixability, a storability in severe environments, and an excellent durability during long-term use.

The present disclosure has been pursued considering the above problem and provides a toner that exhibits an excellent low-temperature fixability, an excellent storability in severe environments, and an excellent durability, and also provides a method for producing the toner.

The toner of the present disclosure is a toner comprising a toner particle that comprises a toner base particle and an outermost layer present on a surface of the toner base particle, the toner base particle containing a binder resin wherein a plurality of concave portions are formed on the surface of the toner particle, and when T (nm) is an average thickness of the outermost layer in analysis of a cross section of the toner particle as observed with a transmission electron microscope, and a (nm) is a long diameter of each of the concave portions, b (nm) is a short diameter of each of the concave portions, and d (nm) is a depth of each of the concave portions when the concave portions on the toner particle are measured by using a scanning probe microscope from an outermost surface of the outermost layer toward a center of the toner particle, when "n" represents a number of the concave portions that satisfy formulas (1) to (3) below per 1 $\mu m^2$ of the surface of the toner particle, "n" satisfies formula (4) below:

$$50.0 \leq a \leq 200.0 \quad (1)$$

$$10.0 \leq b \leq 70.0 \quad (2)$$

$$0.7 \times T \leq d \leq 1.5 \times T \quad (3)$$

$$30 \leq n \leq 200 \quad (4).$$

The method for producing a toner of the present disclosure is a method for producing a toner comprising a toner particle that comprises a toner base particle and an outermost layer that covers a surface of the toner base particle, the toner base particle containing a binder resin the production method comprising:

- attaching particles of a dispersing agent to a surface of a toner base particle;
- forming, after the attachment of the particles of a dispersing agent, an outermost layer on the surface of the toner base particle; and
- removing, after the formation of the outermost layer, the particles of a dispersing agent from the surface of the toner base particle.

According to the present disclosure, a toner and a method for producing a toner that exhibit an excellent low-temperature fixability, an excellent storability in severe environments, and an excellent durability can be provided.

Further features of the present invention will become apparent from the following description of exemplary embodiments with reference to the attached drawing.

BRIEF DESCRIPTION OF THE DRAWINGS

The FIGURE is a heat cycle time chart.

DESCRIPTION OF THE EMBODIMENTS

Unless specifically indicated otherwise, the expressions "from XX to YY" and "XX to YY" that show numerical value ranges refer in the present disclosure to numerical value ranges that include the lower limit and upper limit that are the end points.

The toner of the present disclosure is a toner comprising a toner particle that comprises a toner base particle and an outermost layer present on a surface of the toner base particle, the toner base particle containing a binder resin wherein

- a plurality of concave portions are formed on the surface of the toner particle, and
- when T (nm) is an average thickness of the outermost layer in analysis of a cross section of the toner particle as observed with a transmission electron microscope, and
- a (nm) is a long diameter of each of the concave portions, b (nm) is a short diameter of each of the concave portions, and d (nm) is a depth of each of the concave portions when the concave portions on the toner particle are measured by using a scanning probe microscope from an outermost surface of the outermost layer toward a center of the toner particle,
- when "n" represents a number of the concave portions that satisfy formulas (1) to (3) below per 1 $\mu m^2$ of the surface of the toner particle, "n" satisfies formula (4) below:

$$50.0 \leq a \leq 200.0 \tag{1}$$

$$10.0 \leq b \leq 70.0 \tag{2}$$

$$0.7 \times T \leq 5d \leq 1.5 \times T \tag{3}$$

$$30 \leq n \leq 200 \tag{4}$$.

The present inventor carried out investigations and found that when an outermost layer is present on a toner particle, the area where the toner base particle is exposed at the toner particle surface is made small, toner base particle-to-toner base particle contact between toner particles is suppressed, and the storability in severe environments is improved. It was also found that the charging characteristics are improved by increasing the area over which the outermost layer is present on the toner particle surface.

It was also found, on the other hand, that the low-temperature fixability can be impaired when the area over which the outermost layer is present on the toner particle surface is increased. The heat stability of the toner particle assumes an increasing trend when an outermost layer is present on the surface of the toner base particle. Due to this, the outermost layer exercises a large effect on the thermal properties of the toner base particle when the area over which the outermost layer is present on the toner particle surface is increased, and a reduction in the low-temperature fixability exhibited by the toner base particle can then occur.

On the occasion of intensive investigations by the present inventor in order to overcome this phenomenon, the present inventor discovered that, by having the outermost layer of the toner base particle have concave portions, the configuration of the outermost layer and toner base particle at the toner particle surface could be better controlled than heretofore and the severe environment storability could be made to coexist with an excellent low-temperature fixability and durability.

A concave portion in the toner particle surface denotes a region where the toner base particle is exposed or a region where the thickness of the outermost layer becomes thin, and is presumed to function to reduce the area over which the outermost layer is present on the toner particle surface. A novel effect was also found: when concave portions are formed in the toner particle surface, the external additive is then fixed in the concave portions and a trend of stabilization of the charging performance and flowability is then displayed even during long-term use. The present inventor thought that, by controlling the size and number of the concave portions, the severe environment storability could be made to coexist with a suppression of the impairment of the low-temperature fixability, and thus achieved the present disclosure.

More specifically, when T (nm) is an average thickness of the outermost layer in analysis of a cross section of the toner particle as observed with a transmission electron microscope, and

- a (nm) is a long diameter of each of the concave portions, b (nm) is a short diameter of each of the concave portions, and d (nm) is a depth of each of the concave portions when the concave portions on the toner particle are measured by using a scanning probe microscope from an outermost surface of the outermost layer toward a center of the toner particle,
- when "n" represents a number of the concave portions that satisfy formulas (1) to (3) below per 1 $\mu m^2$ of the surface of the toner particle, "n" satisfies formula (4) below:

$$50.0 \leq a \leq 200.0 \tag{1}$$

$$10.0 \leq b \leq 70.0 \tag{2}$$

$$0.7 \times T \leq d \leq 1.5 \times T \tag{3}$$

$$30 \leq n \leq 200 \tag{4}$$.

When "n" represents a number of the concave portions that satisfy formulas (1) to (3) below per 1 $\mu m^2$ of the surface of the toner particle, "n" is from 30 to 200.

When the number of the concave portions "n" is less than 30, low-temperature fixability is not obtained and storability in severe environments is not obtained. In addition, storability in severe environments is not obtained when the number of the concave portions "n" is larger than 200. From the standpoints of the low-temperature fixability, durability, and storability in severe environments, the number of the concave portions "n" is preferably from 60 to 180 and is more preferably from 100 to 150.

The number of concave portions "n" can be controlled through the concentration of dispersing agent particles that are attached to the toner base particle during formation of the outermost layer and through the heating temperature during formation of the outermost layer. Specifically, the number of the concave portions "n" increases with an increase in the concentration of the dispersing agent particles and with an increase in the heating temperature during formation of the outermost layer.

As provided by measurement of the concave portions in the toner particle surface using a scanning probe microscope (also referred to hereafter as an SPM), the long diameter A of the concave portions is preferably from 50.0 nm to 200.0 nm and is more preferably from 80.0 nm to 170.0 nm. The short diameter B of the concave portions, as provided by the same measurement, is preferably from 10.0 nm to 70.0 nm and more preferably from 20.0 nm to 45.0 nm.

The low-temperature fixability tends to be more improved when the long diameter A of the concave portions is at least 50.0 nm. The low-temperature fixability also tends to be more improved when the short diameter B of the concave portions is at least 10.0 nm.

On the other hand, the storability in severe environments tends to be more improved when the long diameter A of the concave portions is not more than 200.0 nm. The storability in severe environments also tends to be more improved when the short diameter B of the concave portions is not more than 70.0 nm.

The long diameter A of the concave portions and the short diameter B of the concave portions can be controlled through the long diameter and short diameter of the dispersing agent particles that are attached to the toner base particle when the outermost layer is formed, and the long diameter and short diameter of these dispersing agent particles can be controlled through, for example, the reaction temperature and shear conditions during production of the dispersing agent particles. Specifically, a higher reaction temperature and stronger shear conditions during production of the dispersing agent particles tend to provide a smaller long diameter A and short diameter B of the concave portions.

The following formula is preferably satisfied by the average thickness T of the outermost layer in analysis of the toner cross section as observed with a transmission electron microscope (also indicated by TEM in the following), and by the depth D of the concave portions as obtained by measurement of the concave portions on the toner particle surface, using a scanning probe microscope, from the outermost surface of the outermost layer toward the center of the toner particle.

$$0.7\times T\leq D\leq 1.5\times T$$

This D is more preferably from 0.8×T (nm) to 1.1×T (nm).

When D is at least 0.7×T, the area of the toner base particle present in the concave portions is then large, and as a result the low-temperature fixability tends to be more improved. When, on the other hand, D is not greater than 1.5×T, the concave portions are then not too deep and as a result the occurrence of strain in the surface of the outermost layer and the occurrence of burial of the external additive are suppressed and the durability tends to be more improved.

The concave portion depth D can be controlled, for example, through the concentration of the dispersing agent particles that are attached to the toner base particle when the outermost layer is formed, and through the amount of addition of the material that forms the outermost layer. Specifically, the concave portion depth D assumes an increasing trend as the concentration of the dispersing agent particles increases and as the amount of addition of the material that forms the outermost layer increases.

When "N" represents a number of the concave portions that satisfy both formulas (5) and (6) below per 1 $\mu m^2$ of the surface of the toner particle (such concave portions are also referred to in particular as oversized concave portions in the following), "N" is not more than 10. This N is more preferably not more than 5. In addition, the number of the oversized concave portions "N" is preferably at least 0. Any combination of these numerical value ranges may be used.

$$250.0<a \quad (5)$$

$$100.0<b \quad (6)$$

When the number of the oversized concave portions "N" having a long diameter a greater than 250.0 nm and a short diameter b greater than 100.0 nm is not more than 10 per 1 $\mu m^2$ of the toner particle surface, toner base particle-to-toner base particle contact in severe environments is suppressed and the storability in severe environments tends to be more improved.

The number of the oversized concave portions "N" having a long diameter a greater than 250.0 nm and a short diameter b greater than 100.0 nm can be adjusted through, for example, the concentration of the dispersing agent particles that are attached to the toner base particle during formation of the outermost layer. Specifically, as the concentration of the dispersing agent particles declines, a declining trend is assumed by the number of the oversized concave portions "N" having a long diameter a larger than 250.0 nm and a short diameter b larger than 100.0 nm.

The average thickness T (nm) of the outermost layer is preferably from 5.0 nm to 100.0 nm.

The durability and the storability in severe environments tend to be more improved when the average thickness T (nm) of the outermost layer is at least 5.0 nm. The low-temperature fixability tends to be more improved when, on the other hand, the average thickness T (nm) of the outermost layer is not more than 100.0 nm.

The average thickness T (nm) of the outermost layer can be controlled through, for example, the amount of addition of the material that forms the outermost layer. Specifically, the average thickness T (nm) of the outermost layer assumes an increasing trend as the amount of addition of the material that forms the outermost layer increases.

From the standpoint of achieving coexistence between the low-temperature fixability and the durability and severe environment storability, the average thickness T (nm) of the outermost layer is more preferably from 10.0 nm to 60.0 nm.

Outermost Layer: The outermost layer preferably contains a thermoplastic resin. The content of the thermoplastic resin in the outermost layer may be, for example, from 50 mass % to 100 mass %.

The thermoplastic resin can be exemplified by the following resins: styrenic resins, acrylic resins (for example, acrylate ester polymers and methacrylic acid polymers), olefin resins (for example, polyethylene resins and polypropylene resins), vinyl chloride resins, polyvinyl alcohol, vinyl ether resins, N-vinyl resins, polyester resins, polyamide resins, and urethane resins.

Also usable are copolymers of these resins, i.e., copolymers (for example, styrene-acrylic resins and styrene-butadiene resins) provided by the insertion of a freely selected repeat unit into an aforementioned resin.

The thermoplastic resin preferably includes a styrene-acrylic resin. A copolymer of at least one kind of styrenic monomers and at least one kind of (meth)acrylic monomers is also a preferred embodiment of this styrene-acrylic resin.

For example, styrenic monomers and (meth)acrylic monomers as indicated in the following can be favorably used to synthesize the styrene-acrylic resin.

Favorable examples of the styrenic monomer are styrene, alkylstyrenes (for example, α-methylstyrene, p-ethylstyrene, and 4-tert-butylstyrene), p-hydroxystyrene, m-hydroxystyrene, vinyltoluene, α-chlorostyrene, α-chlorostyrene, m-chlorostyrene, and p-chlorostyrene.

Favorable examples of the (meth)acrylic monomers are (meth)acrylic acid, (meth)acrylonitrile, alkyl (meth)acrylate esters, and hydroxyalkyl (meth)acrylate esters.

Favorable examples of alkyl (meth)acrylate esters are methyl (meth)acrylate, ethyl (meth)acrylate, n-propyl (meth)acrylate, isobutyl (meth)acrylate, butyl (meth)acrylate, and 2-ethylhexyl (meth)acrylate.

Favorable examples of the hydroxyalkyl (meth)acrylate esters are 2-hydroxyethyl (meth)acrylate, 3-hydroxypropyl (meth)acrylate, 2-hydroxypropyl (meth)acrylate, and 4-hydroxybutyl (meth)acrylate.

The outermost layer includes a thermosetting resin in another preferred embodiment. The content of this thermosetting resin in the outermost layer may be, for example, from 50 mass % to 100 mass %.

Favorable examples of the thermosetting resin are melamine resins, urea resins, and glyoxal resins.

The thermosetting resin preferably includes a melamine resin. Melamine resin is, for example, the polycondensate of melamine and formaldehyde, and the monomer used to form a melamine resin is, for example, melamine.

Binder Resin: The binder resin preferably includes a styrene-acrylic resin (more preferably a styrene-alkyl acrylate ester resin). The content of the styrene-acrylic resin in the binder resin may be, for example, from 50 mass % to 100 mass %.

The same monomers as the styrenic monomers and (meth) acrylic monomers described above for synthesis of the thermoplastic resin in the outermost layer can be suitably used as the monomer for synthesis of the styrene-acrylic resin.

The binder resin includes a polyester resin in another preferred embodiment. The content of the polyester resin in the binder resin may be, for example, from 1 mass % to 10 mass % or from 50 mass % to 100 mass %.

The polyester resin can be obtained by the condensation polymerization or cocondensation polymerization of a heretofore known dibasic or at least tribasic carboxylic acid component with a dihydric or at least trihydric alcohol component.

For example, a derivative of the ester (for example, acid halide, anhydride, and lower alkyl ester) may be used as the dibasic or at least tribasic carboxylic acid component. Lower alkyl here means an alkyl group having from 1 to 6 carbon atoms.

The following, for example, can be used as the dibasic carboxylic acid component: dibasic acids such as succinic acid, adipic acid, sebacic acid, phthalic acid, isophthalic acid, terephthalic acid, malonic acid, and dodecenylsuccinic acid and their anhydrides and lower alkyl esters, and aliphatic unsaturated dicarboxylic acids, e.g., maleic acid, fumaric acid, itaconic acid, and citraconic acid.

For example, 1,2,4-benzenetricarboxylic acid and 1,2,5-benzenetricarboxylic acid and their lower alkyl esters can be used as the at least tribasic carboxylic acid component.

A single one of these carboxylic acid components may be used by itself or at least two of these may be used in combination.

Preferred examples of the dihydric or at least trihydric alcohol component are diols, bisphenols, and at least trihydric alcohols.

The dihydric alcohol component can be exemplified by the following compounds: alkylene glycols (ethylene glycol, 1,2-propylene glycol, and 1,3-propylene glycol), alkylene ether glycols (polyethylene glycol and polypropylene glycol), alicyclic diols (1,4-cyclohexanedimethanol), bisphenols (bisphenol A), and alkylene oxide (ethylene oxide or propylene oxide) adducts on alicyclic diols.

The alkyl moiety of the alkylene glycol and alkylene ether glycol may be straight chain or branched. An alkylene glycol having a branched structure can also preferably be used.

The at least trihydric alcohol component can be exemplified by the following compounds: glycerol, trimethylolethane, trimethylolpropane, and pentaerythritol.

A single one of these alcohol components may be used by itself or at least two of these may be used in combination.

As necessary, a monobasic acid such as acetic acid or benzoic acid and a monohydric alcohol such as cyclohexanol or benzyl alcohol may also be used for the purpose of adjusting the acid value or hydroxyl value.

There are no particular limitations on the method for synthesizing the polyester resin, but, for example, a transesterification method or direct polycondensation method, as such or in combination, may be used.

Wax: The toner base particle may contain a wax.

A known wax can be used as this wax.

Specific examples are as follows: petroleum waxes as represented by paraffin waxes, microcrystalline waxes, and petrolatum, and derivatives thereof; montan wax and derivatives thereof; hydrocarbon waxes provided by the Fischer-Tropsch method, and derivatives thereof; polyolefin waxes as represented by polyethylene, and derivatives thereof; and natural waxes as represented by carnauba wax and candelilla wax, and derivatives thereof. These derivatives also include oxides and block copolymers and graft modifications with vinyl monomer.

Also usable are alcohols such as higher aliphatic alcohols; fatty acids such as stearic acid and palmitic acid, and their acid amides, esters, and ketones; hardened castor oil and derivatives thereof; plant waxes; and animal waxes.

A single one of these waxes may be used by itself or at least two of these may be used in combination.

Among the preceding, a trend of an enhanced developing performance and transferability is exhibited when a polyolefin, a hydrocarbon wax provided by the Fischer-Tropsch method, or a petroleum wax is used, which is thus preferred.

An oxidation inhibitor may be added to these waxes in a range that does not influence the effects for the toner according to the present disclosure.

The content of the wax is preferably from 1.0 mass parts to 30.0 mass parts per 100.0 mass parts of the binder resin. The melting point of the wax is preferably from 30° C. to 120° C. and more preferably from 60° C. to 100° C.

The wax preferably contains an ester compound.

This ester compound can be exemplified by esters between a monohydric alcohol and an aliphatic carboxylic acid or an ester between a monobasic carboxylic acid and an aliphatic alcohol, such as behenyl behenate, stearyl stearate, and palmityl palmitate; esters between a dihydric alcohol and an aliphatic carboxylic acid and esters between a dibasic carboxylic acid and an aliphatic alcohol, such as ethylene glycol distearate, dibehenyl sebacate, and hexanediol dibehenate; esters between a trihydric alcohol and an aliphatic carboxylic acid and esters between a tribasic carboxylic acid and an aliphatic alcohol, such as glycerol tribehenate; esters between a tetrahydric alcohol and an aliphatic carboxylic acid and esters between a tetrabasic carboxylic acid and an aliphatic alcohol, such as pentaerythritol tetrastearate and pentaerythritol tetrapalmitate; esters between a hexahydric alcohol and an aliphatic carboxylic acid and esters between a hexabasic carboxylic acid and an aliphatic alcohol, such as dipentaerythritol hexastearate and dipentaerythritol hexapalmitate; and esters between a polyhydric alcohol and an aliphatic carboxylic acid and esters between a polybasic carboxylic acid and an aliphatic alcohol, such as polyglycerol behenate.

The low-temperature fixability is further enhanced due to the plasticizing effect on the toner particle brought about by the use of these ester compounds. Among the preceding, the wax more preferably contains, from the standpoint of the balance between the durability and low-temperature fixability, an ester compound given by formula (7) or formula (8).

(7)

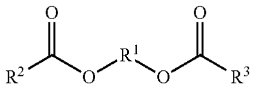

(8)

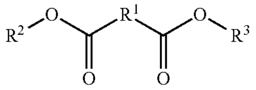

In formulas (7) and (8), $R^1$ represents an alkylene group having from 1 to 6 (preferably from 2 to 6 and more preferably from 2 to 4) carbons and $R^2$ and $R^3$ each independently represent an alkyl group having from 11 to 26 (preferably from 11 to 25 and more preferably from 16 to 22) carbons. This alkyl group may be a straight-chain alkyl group or branched alkyl group, but straight-chain alkyl groups are preferred.

Among ester compounds given by formulas (7) and (8), ethylene glycol distearate, in which $R^1$ is a $C_2$ alkylene group and $R^2$ and $R^3$ are $C_{17}$ straight-chain alkyl groups, is more preferred.

The content of the ester compound in the wax is preferably from 50 mass % to 100 mass % and more preferably from 70 mass % to 100 mass %. Coexistence between the durability and low-temperature fixability is more readily brought about when the ester compound content in the wax is in the indicated range.

Colorant: The toner base particle may contain a colorant. Known pigments and dyes can be used as the colorant. Pigments are preferred for the colorant from the standpoint of providing an excellent weathering resistance.

Cyan colorants can be exemplified by copper phthalocyanine compounds and derivatives thereof, anthraquinone compounds, and basic dye lake compounds.

Specific examples are as follows: C.I. Pigment Blue 1, 7, 15, 15:1, 15:2, 15:3, 15:4, 60, 62, and 66.

Magenta colorants can be exemplified by condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples are as follows: C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254, and C.I. Pigment Violet 19.

Yellow colorants can be exemplified by condensed azo compounds, isoindolinone compounds, anthraquinone compounds, azo-metal complexes, methine compounds, and allylamide compounds.

Specific examples are as follows: C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Black colorants can be exemplified by carbon black and by black colorants provided by color mixing using the aforementioned yellow colorants, magenta colorants, and cyan colorants to give a black color.

A single one of these colorants may be used by itself or a mixture of at least two of these may be used. These may also be used in solid solution form.

The content of the colorant is preferably from 1.0 mass parts to 20.0 mass parts per 100.0 mass parts of the binder resin.

Charge Control Agents and Charge Control Resins: The toner base particle may contain at least one selection from the group consisting of charge control agents and charge control resins.

A known charge control agent can be used as the charge control agent, wherein a charge control agent that provides a fast triboelectric charging speed and that can maintain a defined and stable triboelectric charge quantity is particularly preferred. When the toner particle is produced by the suspension polymerization method, a charge control agent that exercises little polymerization inhibition and that is substantially free of material soluble in the aqueous medium is particularly preferred.

Charge control agents include charge control agents that control toner to negative charging and charge control agents that control toner to positive charging.

Charge control agents that control the toner to negative charging can be exemplified by monoazo metal compounds; acetylacetone-metal compounds; metal compounds of aromatic oxycarboxylic acids, aromatic dicarboxylic acids, oxycarboxylic acids, and dicarboxylic acids; aromatic oxycarboxylic acids, aromatic monocarboxylic acids, and aromatic polycarboxylic acids and their metal salts, anhydrides, and esters; phenol derivatives such as bisphenol; urea derivatives; metal-containing salicylic acid compounds; metal-containing naphthoic acid compounds; boron compounds; quaternary ammonium salts; calixarene; and charge control resins.

Charge control agents that control toner to positive charging can be exemplified by the following: guanidine compounds; imidazole compounds; quaternary ammonium salts such as tributylbenzylammonium 1-hydroxy-4-naphthosulfonate and tetrabutylammonium tetrafluoroborate, and their onium salt analogues, such as phosphonium salts, and their lake pigments; triphenylmethane dyes and their lake pigments (the laking agent is exemplified by phosphotungstic acid, phosphomolybdic acid, phosphomolybdotungstic acid, tannic acid, lauric acid, gallic acid, ferricyanides, and ferrocyanides); metal salts of higher fatty acids; and charge control resins.

Among these charge control agents, metal-containing salicylic acid compounds are preferred and metal-containing salicylic acid compounds in which the metal is aluminum or zirconium are particularly preferred.

The charge control resin can be exemplified by polymers and copolymers having a sulfonic acid group, sulfonate salt group, or sulfonate ester group. Polymer having a sulfonic acid group, sulfonate salt group, or sulfonate ester group is particularly preferably a polymer that contains at least 2 mass %, as the copolymerization ratio, of a sulfonic acid group-containing acrylamide-type monomer or sulfonic acid group-containing methacrylamide-type monomer, and more preferably is a polymer containing at least 5 mass % of same.

The charge control resin preferably has a glass transition temperature (Tg) from 35° C. to 90° C., a peak molecular weight (Mp) from 10,000 to 30,000, and a weight-average molecular weight (Mw) from 25,000 to 50,000. When this is used, preferred triboelectric charging characteristics can be conferred without exercising an influence on the thermal characteristics required of a toner particle. Moreover, because the charge control resin contains a sulfonic acid group, for example, the dispersibility of the charge control resin itself, as well as the dispersibility of, e.g., the colorant, in the polymerizable monomer composition is improved and the tinting strength, transparency, and triboelectric charging characteristics can then be further improved.

A single one of these charge control agents or charge control resins may be used by itself, or at least two of these may be used in combination.

The content of the charge control agent or charge control resin, per 100.0 mass parts of the binder resin, is preferably from 0.01 mass parts to 20.0 mass parts and is more preferably from 0.5 mass parts to 10.0 mass parts.

Inorganic Particles of, e.g., Silica, Used as External Additive: The toner particle as such may be used as a toner, but is often used as toner after optional mixing with, e.g., an external additive, to attach same to the surface.

The presence of silica particles with a number-average particle diameter (D1) for the primary particles of at least 40.0 nm (preferably at least 80.0 nm) on the toner surface is preferred. This D1 can be, for example, not greater than 200 nm. Any combination of these numerical value ranges may be used.

The content of the silica particles having a primary particle D1 of at least 40.0 nm, per 100 mass parts of the toner particle, is preferably from 0.1 mass parts to 4.0 mass parts and is more preferably from 0.2 mass parts to 3.5 mass parts.

The flowability and charging performance can be improved by the addition to the toner particle of silica particles as an external additive. In addition, by having the primary particle diameter of the external additive be at least 40.0 nm, the inorganic particles then become fixed in the concave portions in the outermost layer and a stabilization of the charging performance and flowability is obtained even during long-term use.

Inorganic particles other than the aforementioned silica particles may be present on the toner surface. Such inorganic particles can be exemplified by titanium oxide particles, alumina particles, silica particles having a primary particle diameter of less than 40.0 nm, and composite oxide particles of the preceding.

The silica particles can be exemplified by the dry silica and fumed silica produced by the vapor-phase oxidation of a silicon halide, and by the wet silica produced from water glass. Dry silica is preferred because dry silica contains little of the silanol group present on the surface and in the interior of silica particles and contains little $Na_2O$ and $SO_3^{2-}$. The dry silica may be a composite fine particle of silica and another metal oxide as produced by the use in the production process of a silicon halide compound in combination with a metal halide compound such as, for example, aluminum chloride or titanium chloride.

Viewed from the standpoints of the charge quantity on the toner, the environmental stability, the properties in high humidity environments, the developing performance, the transferability, and so forth, hydrophobed silica particles (also referred to as hydrophobic silica) are more preferably used as the silica particles.

The treatment agent for this hydrophobic treatment of the silica particles can be exemplified by unmodified silicone varnishes, variously modified silicone varnishes, unmodified silicone oils, variously modified silicone oils, silane compounds, silane coupling agents, other organosilicon compounds, and organotitanium compounds. A single one of these treatment agents may be used by itself or at least two of these may be used in combination.

Among the preceding, silica particles that have been treated with silicone oil are preferred. A hydrophobic silica provided by the hydrophobic treatment of silica particles with a silane coupling agent and treatment with silicone oil either at the same time as or after this treatment, is more preferred from the standpoints of maintaining a high charge quantity on the toner particle even in high humidity environments and reducing selective development.

The BET retention ratio of the toner, which is measured by the method described below, is preferably from 65% to 100% and more preferably from 67% to 100%.

The durability during long-term use tends to be more improved when the BET retention ratio of the toner is in the range from 65% to 100%. The low-temperature fixability and storability in severe environments can also be further improved.

The BET retention ratio of the toner can be controlled through, for example, the addition of inorganic particles having a primary particle D1 of at least 40.0 nm and through the attachment conditions for the external additive (temperature, time).

The method for producing the toner contains the following steps.

(a) Attaching particles of a dispersing agent to a surface of a toner base particle.

(b) Forming, after the attachment of the particles of a dispersing agent, an outermost layer on the surface of the toner base particle.

(c) Removing, after the formation of the outermost layer, the particles of a dispersing agent from the surface of the toner base particle.

The production method according to the present disclosure is described in detail in the following.

In accordance with the process in (a) to (c), dispersing agent particles are attached to the surface of the toner base particle, material for formation of the outermost layer is added to the dispersion that contains this toner base particle, and the outermost layer is formed on the surface of the toner base particle. The medium used during formation of the outermost layer is preferably an aqueous medium from the standpoint of preventing the elution of components contained in the toner base particle into the medium.

Dispersing agent particles are attached to the surface of the toner base particle in step (a). The following are examples of methods for attaching the dispersing agent particles to the surface of the toner base particle: addition of the dispersing agent after toner base particles have been mechanically dispersed in the aqueous medium using a device that has a strong stirring capability; addition of toner base particles to an aqueous medium that contains the dispersing agent. Between these, the addition of toner base particles to an aqueous medium containing the dispersing agent is preferred because this enables a uniform dispersion of the toner base particles in the aqueous medium using little power.

For example, a polymeric dispersing agent, surfactant, resin particles, or inorganic particles can be used without particular limitation as the dispersing agent. Among these, the use of inorganic particles is preferred from the standpoints of preventing surface modification of the surface of the toner base particle and bringing about a high level of dispersion of the toner base particle in the medium (particularly an aqueous medium). Particles of an inorganic compound, e.g., sodium phosphate or calcium chloride, can be used as the inorganic particles.

The number-average particle diameter of the dispersing agent particles is preferably from 30 nm to 350 nm and more preferably is from 50 nm to 200 nm. The amount of use of the dispersing agent particles, per 100 mass parts of the toner base particle, is preferably from 0.3 mass parts to 30 mass parts and more preferably from 0.5 mass parts to 10.0 mass parts.

Due to the uniform dispersion of the dispersing agent particles in the aqueous medium containing the dispersing agent particles, the dispersing agent particles can be attached to the toner base particle surface by introducing the toner base particles and carrying out mechanical mixing with a stirring device.

When the toner base particle is produced by the suspension polymerization method, an aqueous dispersion of toner base particles having dispersing agent particles attached to the surface is produced in the production process, and as a consequence this aqueous dispersion of toner base particles can also be used as such as a toner base particle dispersion. That is, a step of attaching dispersing agent particles to the toner base particle surface can be included in the step of producing toner base particles.

The outermost layer is formed on the toner base particle surface in step (b). For example, an outermost layer can be formed on the toner base particle surface by adding the material of the outermost layer to the toner base particle dispersion.

For example, the aforementioned thermoplastic resins and the aforementioned thermosetting resins can be used as the material of the outermost layer. When a thermoplastic resin is used as the material of the outermost layer, the outermost layer can be formed, for example, by mixing a dispersion of the thermoplastic resin with the toner base particles to attach the thermoplastic resin to the surface of the toner base particles in the aqueous dispersion, and heating. When a thermosetting resin is used as the material of the outermost layer, the outermost layer can be formed by mixing the monomer constituting the thermosetting resin with the toner base particle and developing the reaction at the surface of the toner base particle in the aqueous medium by heating.

The outermost layer covers areas where the dispersing agent particles attached in step (a) are attached and is formed in a film configuration on all or a portion of the toner base particle surface.

The temperature during formation of the outermost layer is preferably from 40° C. to 90° C. and is more preferably from 50° C. to 80° C. Formation of the outermost layer proceeds well by carrying out formation of the outermost layer in this temperature range.

In step (c), the dispersing agent particles are removed from the toner base particle surface after the outermost layer has been formed. When the dispersing agent particles are inorganic particles, for example, removal from the toner base particle surface can be carried out by dissolving the inorganic particles using acid and subsequently performing filtration. Removal of the dispersing agent particles enables the shape of the dispersing agent particle to be formed into a concave portion shape in the outermost layer.

This is followed as necessary by repeated dispersion in water and filtration to obtain a toner particle having concave portions in the surface.

The methods for measuring the various property values are described in the following.

Method for Measuring Long Diameter of Each of Concave Portions, Short Diameter of Each of Concave Portions, Depth of Each of Concave Portions, and Number of Concave Portions in Toner Particle Surface The concave portions in the toner particle surface are observed using a scanning probe microscope (SPM) and the following method.

An SI-DF20 (Al coated back side) from Seiko Instruments Inc. is used for the measurement cantilever and is operated in dynamic force mode. The SPM is used after checking the accuracy in the depth direction pre-measurement using a pattern sample (100 nm±5 nm) for accuracy checking.

Conductive two-sided tape is first applied to the sample stand, and the toner particles are sprayed onto this. The excess toner particles are removed from the sample stand by blowing with air. Using this sample, the toner particle surface is magnified to 1 μm×1 μm using the SPM (product name: E-sweep, Hitachi High-Tech Science Corporation) and the concave portions in the outermost layer are observed.

After the measurement, tilt correction is performed on the obtained 1 μm×1 μm measurement data and the mean surface roughness is then calculated. The mean surface roughness means the arithmetic average value, over the 1 μm×1 μm, of the depth of the concave portions for measurement toward the center of the toner particle from the outermost surface of the outermost layer, and is designated the depth $d_1$ (nm) of the concave portions in the outermost layer in the present disclosure. The depths from $d_1$ to $d_{50}$ of the concave portions for 50 toner particles are determined by this method, and the arithmetic average value of from $d_1$ to $d_{50}$ is taken to be the depth D (nm) of the concave portions.

The number of concave portions "n" that satisfy formulas (1) to (3) and the number of the oversized concave portions "N" are determined as follows. The tilt-corrected measurement data provided by the aforementioned measurement is output; the long diameters a (nm) of the concave portions, the short diameters b (nm) of the concave portions, and the depths d (nm) of the concave portions in 1 μm×1 μm are surveyed; and the number of concave portions "$n_1$" that satisfy formulas (1) to (3) and the number of oversized concave portions "$N_1$", in each case per 1 μm×1 μm of the toner particle surface, are counted. The numbers from $n_1$ to $n_{50}$ of concave portions satisfying formulas (1) to (3) and the numbers from $N_1$ to $N_{50}$ of oversized concave portions are counted for 50 toner particles using this method, and their arithmetic average values are designated the number of concave portions "n" and the number of oversized concave portions "N", respectively.

The long diameter A of the concave portions and the short diameter B of the concave portions are determined as follows. The tilt-corrected measurement data provided by the aforementioned measurement is output; the arithmetic average values of the long diameters of the concave portions and the short diameters of the concave portions per 1 μm×1 μm of the toner particle surface are determined and are respectively designated the long diameter $a_1$ of the concave portions and the short diameter $b_1$ of the concave portions. The long diameters from $a_1$ to $a_{50}$ of the concave portions and the short diameters from $b_1$ to $b_{50}$ of the concave portions are determined for 50 toner particles using this method, and their arithmetic average values are designated the long diameter A of the concave portions and the short diameter B of the concave portions, respectively.

Method for Obtaining Toner Particles by Removal of External Additive from Toner

When the concave portions were to be measured on the surface of toner having an external additive attached to the surface, the external additive was removed using the following procedure and the measurements of the concave portions by the methods described above were performed on the resulting toner particles.

A 61.5% aqueous sucrose solution is prepared by the addition of 160 g of sucrose (Kishida Chemical Co., Ltd.) to 100 mL of deionized water and dissolving while heating on a water bath. 31.0 g of this sucrose concentrate and 6 g of Contaminon N (product name) (a 10 mass % aqueous solution of a neutral pH 7 detergent for cleaning precision measurement instrumentation, including a nonionic surfactant, anionic surfactant, and organic builder, Wako Pure Chemical Industries, Ltd.) are introduced into a centrifugal separation tube to prepare a dispersion. 1.0 g of the toner is added to this dispersion, and clumps of the toner are broken up using, for example, a spatula.

The centrifugal separation tube is shaken with a shaker for 20 minutes at 300 strokes per minute (spm). After shaking, the solution is transferred over to a glass tube (50 mL) for swing rotor service, and separation is performed with a centrifugal separator using conditions of 3,500 rpm and 30 minutes.

Satisfactory separation of the toner particles from the aqueous solution is checked visually, and the toner particles separated into the uppermost layer are recovered with, for example, a spatula. The recovered toner particles are filtered using a reduced pressure filter and are then dried for at least one hour in a dryer. The dried product is broken up with a spatula to yield toner particles.

Method for Measuring Average Thickness T of Outermost Layer

The cross section of the toner particle is observed with a transmission electron microscope (TEM) using the following method.

The toner particles are first thoroughly dispersed in a normal temperature-curable epoxy resin followed by curing for 2 days in a 40° C. atmosphere. Thin-section samples with a thickness of 50 nm are sliced from the resulting cured material using a microtome equipped with a diamond blade, and ruthenium staining is performed using a vacuum staining device (Filgen, Inc.). The resulting sample is then magnified 100,000× using a TEM (product name: Tecnai TF20XT electron microscope, FEI Company). The thickness (unit: nm) of the outermost layer is measured at four randomly selected locations on a single toner particle.

Examination of the cross section is carried out on 50 toner particles using this method, and the arithmetic average value for the total of 200 locations is used as the average thickness T (nm).

Method for Measuring Weight-Average Particle Diameter (D4) and Number-Average Particle Diameter (D1)

The weight-average particle diameter (D4) and number-average particle diameter (D1) of the toner, toner particle, and toner base particle (also referred to below as, for example, toner) is determined proceeding as follows.

The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube.

The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0% and, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 m" (Beckman Coulter, Inc.).

The threshold value and noise level are automatically set by pressing the "threshold value/noise level measurement button". In addition, the current is set to 1,600 ρA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement procedure is as follows.

(1) 200.0 mL of the aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100-mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, including a nonionic surfactant, anionic surfactant, and organic builder, from Wako Pure Chemical Industries, Ltd.).

(3) An "Ultrasonic Dispersion System Tetora 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the, e.g., toner, is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing, e.g., dispersed toner, is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) and the number-average particle diameter (D1) are calculated. When set to graph/volume % with the dedicated software, the "average diameter" on the "analysis/volumetric statistical value (arithmetic average)" screen is the weight-average particle diameter (D4). When set to graph/number % with the dedicated software, the "average diameter" on the "analysis/numerical statistical value (arithmetic average)" screen is the number-average particle diameter (D1).

Method for Measuring Volume-Average Diameter of Particles in Thermoplastic Resin Dispersion The volume-average diameter of the particles in the thermoplastic resin dispersion is measured using a Zetasizer Nano-ZS (Malvern Instruments Ltd.).

A measurement sample is first prepared by diluting the thermoplastic resin dispersion to be measured with water to a solid-liquid ratio of 0.10 mass % (±0.02 mass %), and this is introduced into a quartz cell, which is installed in the measurement section. The refractive index of the thermoplastic resin and the refractive index and viscosity of the dispersing medium are input for the measurement conditions, and measurement is carried out in the range from 0.3 nm to 10.0 μm.

Method for Measuring Glass Transition Temperature (Tg)

The glass transition temperature (Tg) of, e.g., the toner base particle or outermost layer material, is measured using a "Q1000" differential scanning calorimeter (TA Instruments) in accordance with ASTM D 3418-82.

The melting points of indium and zinc are used for temperature correction in the instrument detection section, and the heat of fusion of indium is used for correction of the amount of heat.

Specifically, a 10 mg sample is exactly weighed out and this is introduced into an aluminum pan; an empty aluminum pan is used for reference. The measurement is run at a ramp rate of 10° C./min in the measurement temperature range from 30° C. to 200° C.

In the measurement, heating is carried out to 200° C., followed by cooling to 30° C. at a ramp down rate of 10° C./min and then reheating.

The change in the specific heat in the temperature range of from 40° C. to 100° C. is obtained in this second heating process. The glass transition temperature (Tg) is taken to be the point at the intersection between the differential heat curve and the line for the midpoint for the baselines for prior to and subsequent to the appearance of the change in the specific heat.

Measurement of BET Specific Surface Area of Toner

The BET specific surface area of the toner is measured in accordance with JIS Z 8830 (2001). The specific measurement procedure is as follows.

A "TriStar 3000 (Shimadzu Corporation) automatic specific surface area/pore distribution analyzer", which employs a constant-volume gas adsorption method as its measurement principle, is used as the measurement instrument. The "TriStar 3000 Version 4.00" dedicated software provided with this instrument is used to set the measurement conditions and analyze the measurement data. A vacuum pump, nitrogen gas line, and helium gas line are connected to the instrument. The value calculated by the BET multi-point method using nitrogen gas as the adsorption gas is used as the BET specific surface area in the present disclosure.

The BET specific surface area is specifically determined as follows.

First, nitrogen gas is adsorbed on the sample (toner) and the equilibration pressure P (Pa) within the sample cell and the amount of nitrogen adsorption Va ($mol\cdot g^{-1}$) by the sample are measured at this point. The adsorption isotherm is obtained using the relative pressure Pr, which is the value provided by dividing the equilibration pressure P (Pa) within the sample cell by the saturation vapor pressure of nitrogen Po (Pa), for the horizontal axis and using the amount of nitrogen adsorption Va ($mol\cdot g^{-1}$) for the vertical axis. The monomolecular layer adsorption amount Vm ($mol\cdot g^{-1}$), which is the amount of adsorption required to form a monomolecular layer on the surface of the sample, is then determined using the BET equation provided below.

$$Pr/Va(1-Pr)=1/(Vm\times C)+(C-1)\times Pr/(Vm\times C)$$

Here, C is the BET parameter and is a variable that changes with the type of measurement sample, the type of adsorption gas, and the adsorption temperature.

The BET equation can be rendered as a straight line, with a slope of (C−1)/(Vm×C) and an intercept of 1/(Vm×C), by using Pr for the X-axis and Pr/Va(1−Pr) for the Y-axis. This straight line is called a BET plot.

$$\text{Slope of the straight line}=(C-1)/(Vm\times C)$$

$$\text{Intercept of the straight line}=1/(Vm\times C)$$

The value of the slope of this straight line and the value of its intercept can be calculated by plotting the measured values of Pr and the measured values of Pr/Va(1−Pr) on a graph and generating a straight line by the least-squares method.

Using these values, Vm and C can be calculated by solving the aforementioned simultaneous equations for the slope and intercept.

The BET specific surface area S ($m^2\cdot g^{-1}$) of the sample is then calculated using the following formula, the Vm calculated as above, and the molecular cross-sectional area of the nitrogen molecule (0.162 $nm^2$).

$$S=Vm\times N\times 0.162\times 10^{-18}$$

Here, N is Avogadro's number ($mol^{-1}$).

The procedure for calculating Vm is described in the following. The procedure for determining Vm using this instrument is carried out according to the "TriStar 3000 Instruction Manual V4.0" provided with the instrument, and the measurement is specifically carried out using the following procedure.

The glass sample cell (stem diameter=⅜ inch, volume=approximately 5 mL) provided with the instrument is thoroughly cleaned and dried and then exactly weighed to determine the tare mass. The sample is introduced into this sample cell using a funnel. The sample amount is adjusted as appropriate in accordance with the specific gravity and particle diameter of the sample; for toner, approximately 1.0 g is introduced.

The sample cell loaded with the sample is set in a "Vacuprep 061 Pretreatment Apparatus" (Shimadzu Corporation) connected to a vacuum pump and nitrogen gas line and vacuum degassing is continued for about 10 hours at 23° C. This vacuum degassing is performed by gradually degassing while adjusting the valve in order to avoid suctioning sample into the vacuum pump. The pressure in the cell gradually drops as degassing proceeds and approximately 0.4 Pa (approximately 3 millitorr) is finally reached. After the completion of vacuum degassing, nitrogen gas is gradually introduced and the interior of the sample cell is returned to atmospheric pressure and the sample cell is removed from the pretreatment apparatus. The mass of this sample cell is exactly weighed and the precise mass of the toner is calculated from the difference from the tare mass. The sample cell is closed with a rubber stopper during weighing in order to prevent the sample in the sample cell from being contaminated with, for example, moisture in the atmosphere.

Measurement of the free space in the sample cell including the connection fixtures is then performed. For the free space, the volume of the sample cell is measured at 23° C. using helium gas; then, after the sample cell has been cooled with liquid nitrogen, the volume of the sample cell is similarly measured using helium gas; and the free space is calculated converting from the difference in these volumes. In addition, the saturation vapor pressure Po (Pa) of the nitrogen is automatically measured separately using the Po tube built into the instrument.

Then, after the interior of the sample cell has been vacuum degassed, the sample cell is cooled with liquid nitrogen while vacuum degassing is continued. After this, nitrogen gas is admitted in stages into the sample cell and the nitrogen molecules are adsorbed to the sample. At this point, the above-described adsorption isotherm is obtained by measurement of the equilibration pressure P (Pa) as required, and this adsorption isotherm is converted to a BET plot. The relative pressure Pr points for data collection are set at a total of six points, i.e., 0.05, 0.10, 0.15, 0.20, 0.25, and 0.30. A straight line is generated by the least-squares method from the obtained measurement data and Vm is calculated from the slope and intercept of this straight line. Using this value of Vm, the BET specific surface area of the toner is calculated as described above.

Method for Identifying Resin Type for Resin in Outermost Layer

The type of resin is identified for the resin in the outermost layer using time-of-flight secondary ion mass spectrometry (TOF-SIMS).

Measurement instrument: TRIFT IV TOF-SIMS (Ulvac-Phi, Inc.)
Primary ion species: gold ion ($Au^+$)
Primary ion acceleration voltage: 30 keV
Primary ion current value: 2 pA
Area of analysis: 300×300 $\mu m^2$
Number of pixels: 256×256 pixels
Analysis time: 3 min
Repeat frequency: 8.2 kHz
Charge neutralization: on
Secondary ion polarity: positive
Secondary ion mass range (m/z): from 0.5 to 1,850

Method for Identifying Resin Type for Binder Resin, and Method for Identifying Structure of Ester Wax Compound in Wax The resin type for the binder resin and the structure of the ester wax compound in the wax are identified using nuclear magnetic resonance spectroscopy ($^1$H-NMR) [400 MHz, $CDCl_3$, room temperature (25° C.)] or pyrolysis GCMS.

Measurement Conditions in Nuclear Magnetic Resonance Spectroscopy ($^1$H-NMR)

Measurement instrument: JNM-EX400 FT-NMR instrument (JEOL Ltd.)
Measurement frequency: 400 MHz
Pulse condition: 5.0 μs
Frequency range: 10,500 Hz
Number of scans: 64
Solvent: A deuterated solvent that dissolves the toner is used as appropriate.

Pyrolysis GCMS Measurement Conditions

Measurement instrument: pyrolysis GCMS instrument
Pyrolysis instrument: JPS700 Curie Point Pyrolyzer (Japan Analytical Industry Co., Ltd.)
Pyrofoil: F590 (Curie point of 590° C.)
GCMS: Focus GC/ISQ (Thermo Fisher Scientific K.K.)
Carrier gas: He gas (purity of 99.99995%)
Column: HP-5MS (30 m, inner diameter of 0.25 mm, film thickness of 0.25 μm)
Injection port temperature: 280° C., MS transfer temperature: 280° C., Ion source
temperature: 250° C.
Oven temperature: start at 50° C. and hold for 3 minutes; then heat to 300° C. at 10° C./min; then hold for 30 minutes
Helium flow rate: 1.2 mL/min, constant flow rate control, Split ratio: 20
MS ion source: EI, MS detection range (m/z): from 25 to 800
Library: NIST 0.5 mg of the toner and 5 μL of methylation reagent (10% methanol solution of tetramethylammonium hydroxide) are added to the Pyrofoil under the aforementioned measurement conditions and analysis is performed.

Method for Measuring Number-Average Primary Particle Diameter of External Additive The number-average primary particle diameter of the external additive is determined using a scanning electron microscope (SEM).

Measurement instrument: SEM (JSM-7800F, JEOL Ltd.)
Acceleration voltage: 1.0 kV
Magnification: 100,000×

The toner surface is observed using these conditions and the particle diameter of the external additive is determined. This procedure is repeated and the arithmetic average value for 200 is determined.

EXAMPLES

The toner and toner production method according to the present disclosure are more particularly described by the examples provided below. However, these in no way limit the present disclosure. Unless specifically indicated otherwise, "parts" in the examples and comparative examples is on a mass basis in all instances.

Preparation of Outermost Layer Material: Thermoplastic Resin Dispersion 1 Production Example parts of sodium dodecyl sulfate and 1,000.0 parts of deionized water were introduced into a beaker fitted with stirrer, and stirring was continued at 25° C. until complete dissolution had occurred to prepare an aqueous solution. The following materials were then mixed to prepare a polymerizable monomer composition.

styrene 70.0 parts
butyl acrylate 13.0 parts
2-ethylhexyl acrylate 12.0 parts
methyl methacrylate (MMA) 5.0 parts The temperature of the polymerizable monomer composition was reduced to 15° C., followed by the admixture of 6.0 parts of tertiary-butyl peroxypivalate as polymerization initiator and introduction into the aforementioned aqueous solution. An emulsion of the polymerizable monomer composition was prepared by exposure for 13 minutes (I second intermittent, maintenance of 25° C.) to ultrasound from a high-output ultrasound homogenizer (VCX-750).

This emulsion was introduced into a heat-dried four-neck flask; bubbling with nitrogen was performed for 30 minutes while stirring the emulsion at 200 rpm; and stirring was thereafter carried out for 6 hours at 70° C. To stop the reaction, the emulsion was then air-cooled while being stirred, thus yielding a thermoplastic resin dispersion 1 of a styrene-acrylic resin that would provide the outermost layer material. This thermoplastic resin dispersion was then separated at 16,500 rpm for 1 hour using a centrifugal separator, and the supernatant was removed. Dispersion with the fresh addition of deionized water and separation with a centrifugal separator was repeated three times, and deionized water was then added to prepare a thermoplastic resin dispersion 1 having a solids concentration of 20.0 mass %. The volume-average diameter of the particles in the thermoplastic resin dispersion 1 was measured at 25 nm, and the Tg was 69° C.

Thermoplastic Resin Dispersion 2 Production Example

A thermoplastic resin dispersion 2 was produced proceeding as in the method for producing the thermoplastic resin dispersion 1, but changing the amount of sodium dodecyl sulfate as indicated in Table 1 and changing the composition of the polymerizable monomer composition as indicated below. The volume-average diameter of the particles in the thermoplastic resin dispersion 2 and Tg are given in Table 1.

styrene 35.0 parts
butyl acrylate 6.5 parts
2-ethylhexyl acrylate 6.0 parts
methyl methacrylate (MMA) 2.5 parts Thermoplastic Resin Dispersion 3 Production Example A thermoplastic resin dispersion 3 was produced proceeding as in the method for producing the thermoplastic resin dispersion 1, but changing, as indicated in Table 1, the amount of sodium dodecyl sulfate in the method for producing thermoplastic resin dispersion 1. The volume-average diameter of the particles in the thermoplastic resin dispersion 3 and Tg are given in Table 1.

TABLE 1

| | Sodium dodecyl sulfate (number of parts) | De-ionized water (number of parts) | Poly-merizable monomer composition (number of parts) | Solids concen-tration (mass %) | Volume-average diameter (nm) | Tg (° C.) |
|---|---|---|---|---|---|---|
| Thermo-plastic resin dispersion 1 | 5.0 | 1000.0 | 100.0 | 20.0 | 25 | 69 |
| Thermo-plastic resin dispersion 2 | 10.0 | 1000.0 | 50.0 | 20.0 | 12 | 68 |
| Thermo-plastic resin dispersion 3 | 2.0 | 1000.0 | 100.0 | 20.0 | 43 | 71 |

Toner Base Particle Dispersion 1 Production Example

The following materials were mixed in a reactor fitted with a condenser, stirrer, and nitrogen introduction line and were heated and held at 180° C. while stirring.

styrene 78.0 parts
n-butyl acrylate 20.0 parts
acrylic acid 2.0 parts
xylene 300.0 parts A styrene-acrylic resin 1 was synthesized by continuously adding 50.0 parts of a 2.0% xylene solution of t-butyl hydroperoxide dropwise to the system over 4.5 hours and, after cooling, separating and removing the solvent. The weight-average molecular weight Mw was 14,500, and Tg was 65° C.

The following materials were mixed in a reactor fitted with a condenser, stirrer, and nitrogen introduction line.

polyoxypropylene(2.2)-2,2-bis(4-hydroxyphenyl)propane 58.0 parts
ethylene glycol 8.0 parts
terephthalic acid 31.0 parts
trimellitic anhydride 3.0 parts
dibutyltin oxide 0.3 parts The system was subjected to nitrogen substitution by a pressure-reduction process, after which heating was carried out to 210° C. and a reaction was run for 5 hours while introducing nitrogen and removing the produced water. Then, while continuing to stir, the temperature was gradually raised to 230° C. under reduced pressure, and a polyester resin 1 was synthesized by reaction for an additional 3 hours. The weight-average molecular weight Mw was 9,500, and Tg was 68° C.

The following materials were thoroughly mixed using an FM mixer (Nippon Coke & Engineering Co., Ltd.), followed by melt-kneading using a twin-screw kneader (Ikegai Ironworks Corporation) set to a temperature of 100° C.

styrene-acrylic resin 1 100.0 parts
polyester resin 1 5.0 parts
HNP9 (melting point: 76° C., Nippon Seiro Co., Ltd.) 5.0 parts
ethylene glycol distearate 15.0 parts
C.I. Pigment Blue 15:3 6.3 parts The resulting kneaded material was cooled and was coarsely pulverized to 1 mm and below using a hammer mill to yield a coarse pulverizate.

A fine pulverizate of about 5 μm was then obtained from the resulting coarse pulverizate using a Turbo Mill from Turbo Kogyo Co., Ltd., followed by cutting the fines and coarse powder using a Coanda effect-based multi-grade classifier to obtain the toner base particle 1.

Toner base particle 1 had a number-average particle diameter (D1) of 5.4 μm, a weight-average particle diameter (D4) of 6.8 μm, and a Tg of 58° C.

15.0 parts of sodium phosphate (dodecahydrate) was introduced into 390.0 parts of deionized water in a reactor, and this was held for 1.0 hour at 65° C. while purging with nitrogen.

Stirring was carried out at 12,000 rpm using a T.K. Homomixer (Tokushu Kika Kogyo Co., Ltd.). While maintaining the stirring, an aqueous calcium chloride solution of 9.0 parts of calcium chloride (dihydrate) dissolved in 10.0 parts of deionized water was introduced all at once into the reactor to prepare an aqueous medium that contained inorganic fine particles as a dispersing agent. 1.0 mol/L hydrochloric acid was introduced into the aqueous medium in the reactor to adjust the pH to 6.0 and provide an aqueous medium 1.

200.0 parts of toner base particle 1 was introduced into aqueous medium 1 and dispersion was carried out for 30 minutes at a temperature of 40° C. while rotating at 7,000 rpm using a T.K. Homomixer. Deionized water was added to adjust the toner base particle concentration in the dispersion to 20.0%, thus providing toner base particle dispersion 1.

Toner Base Particle Dispersions 2 to 5 Production Example

Aqueous media 2 to 5 and toner base particle dispersions 2 to 5 were produced proceeding as in the method for producing the toner base particle dispersion 1, but changing, as shown in Table 2, the amounts of the sodium phosphate and calcium chloride used for the aqueous medium 1 in the method for producing the toner base particle dispersion 1.

Toner Base Particle Dispersion 6 Production Example

The following materials were thoroughly mixed using an FM mixer (Nippon Coke & Engineering Co., Ltd.), followed by melt-kneading using a twin-screw kneader (Ikegai Ironworks Corporation) set to a temperature of 100° C.

polyester resin 1 100.0 parts

HNP9 (melting point: 76° C., Nippon Seiro Co., Ltd.) 5.0 parts ethylene glycol distearate 15.0 parts C.I. Pigment Blue 15:3 6.3 parts The resulting kneaded material was cooled and was coarsely pulverized to 1 mm and below using a hammer mill to yield a coarse pulverizate.

A fine pulverizate of about 5 μm was then obtained from the resulting coarse pulverizate using a Turbo Mill from Turbo Kogyo Co., Ltd., followed by cutting the fines and coarse powder using a Coanda effect-based multi-grade classifier to obtain the toner base particle 2.

Toner base particle 2 had a number-average particle diameter (D1) of 5.6 μm, a weight-average particle diameter (D4) of 7.0 μm, and a Tg of 60° C.

200.0 parts of toner base particle 2 was introduced into aqueous medium 1 and dispersion was carried out for 30 minutes at a temperature of 40° C. while rotating at 7,000 rpm using a T.K. Homomixer. Deionized water was added to adjust the toner base particle concentration in the dispersion to 20.0%, thus providing toner base particle dispersion 6.

Toner Base Particle Dispersion 7 Production Example 14.0 parts of sodium phosphate (dodecahydrate) was introduced into 390.0 parts of deionized water in a reactor, and this was held for 1.0 hour at 65° C. while purging with nitrogen.

Stirring was carried out at 12,000 rpm using a T.K. Homomixer (Tokushu Kika Kogyo Co., Ltd.). While maintaining the stirring, an aqueous calcium chloride solution of 9.2 parts of calcium chloride (dihydrate) dissolved in 10.0 parts of deionized water was introduced all at once into the reactor to prepare an aqueous medium that contained inorganic fine particles as a dispersing agent. 1.0 mol/L hydrochloric acid was introduced into the aqueous medium in the reactor to adjust the pH to 6.0 and provide aqueous medium 6.

Polymerizable Monomer Composition 1 Preparation styrene 60.0 parts

C.I. Pigment Blue 15:3 6.3 parts

These materials were introduced into an attritor (Nippon Coke & Engineering Co., Ltd.) and dispersion was carried out for 5.0 hours at 220 rpm using zirconia particles with a diameter of 1.7 mm to prepare a colorant dispersion in which the pigment was dispersed.

The following materials were then added to this colorant dispersion.

styrene 18.0 parts n-butyl acrylate 20.0 parts polyester resin a 5.0 parts (condensation polymer of terephthalic acid and the 2 mol adduct of propylene oxide on bisphenol A, weight-average molecular weight Mw=10,000)

HNP9 (melting point: 76° C., Nippon Seiro Co., Ltd.) 6.0 parts ethylene glycol distearate 15.0 parts This material was then held at 65° C. and a polymerizable monomer composition 1 was prepared by dissolving and dispersing to uniformity at 500 rpm using a T.K. Homomixer.

Granulation Step

While holding the temperature of aqueous medium 6 at 70° C. and the stirrer rotation rate at 12,000 rpm, the polymerizable monomer composition 1 was introduced into the aqueous medium 6 and 7.0 parts of the polymerization initiator t-butyl peroxypivalate was added. Granulation was performed for 10 minutes under these conditions while maintaining 12,000 rpm with the stirrer.

Polymerization Step

The high-speed stirrer was replaced with a stirrer equipped with a propeller impeller and polymerization was carried out for 5.0 hours while maintaining 70° C. and stirring at 150 rpm. An additional polymerization reaction was run by raising the temperature to 85° C. and heating for 2.0 hours. Deionized water was added to adjust the toner base particle concentration in the dispersion to 20.0%, thus yielding toner base particle dispersion 7 in which toner base particle 3 was dispersed.

Toner base particle 3 had a number-average particle diameter (D1) of 5.4 μm, a weight-average particle diameter (D4) of 6.2 μm, and a Tg of 56° C.

Toner Base Particle Dispersion 8 Production Example

A reactor holding 400.0 parts of deionized water was held at 30° C., after which dilute hydrochloric acid was added to adjust the pH of the aqueous medium to 4.0. After the pH had been adjusted, the following materials were introduced and dissolution was carried out to obtain aqueous medium 7.

Mirbane Resin SM-607 methylolmelamine aqueous solution (80% solids concentration) 0.6 parts aqueous polyacrylamide solution (BECKAMINE A-1 thermoplastic resin dispersion (DIC Corporation), aqueous solution with a solids concentration of 11 mass %) 5.0 parts 200.0 parts of toner base particle 1 was added to aqueous medium 7 and the reactor was stirred for 1 hour at a rate of 200 rpm. Deionized water was then added to adjust the toner base particle concentration in the dispersion to 20.0%, thus yielding a toner base particle dispersion 8 in which toner base particle 1 was dispersed.

Toner Base Particle Dispersion 9 Production Example

A reactor holding 400.0 parts of deionized water was held at 30° C., after which dilute hydrochloric acid was added to adjust the pH of the aqueous medium to 4.0. After the pH had been adjusted, the following material was introduced to obtain aqueous medium 8.

thermoplastic resin dispersion 1 5.0 parts 200.0 parts of toner base particle 1 was added to aqueous medium 8 and the reactor was stirred for 1 hour at a rate of 200 rpm. Deionized water was then added to adjust the toner base particle concentration in the dispersion to 20.0%, thus yielding a toner base particle dispersion 9 in which toner base particle 1 was dispersed.

Toner Base Particle Dispersion 10 Production Example

A reactor holding 400.0 parts of deionized water was held at 30° C., after which dilute hydrochloric acid was added to adjust the pH of the aqueous medium to 4.0. After the pH had been adjusted, the following material was introduced to obtain aqueous medium 9.

thermoplastic resin dispersion 3 3.0 parts parts of toner base particle 1 was added to aqueous medium 9 and the reactor was stirred for 1 hour at a rate of 200 rpm. Deionized water was then added to adjust the toner base particle concentration in the dispersion to 20.0%, thus yielding a toner base particle dispersion 10 in which toner base particle 1 was dispersed.

Toner Base Particle Dispersion 11 Production Example

A reactor holding 400.0 parts of deionized water was held at 30° C., after which dilute hydrochloric acid was added to adjust the pH of the aqueous medium to 4.0. After the pH had been adjusted, the following material was introduced to obtain aqueous medium 10.

Mirbane Resin SM-607 methylolmelamine aqueous solution (80% solids concentration) 1.2 parts 200.0 parts of toner base particle 2 was added to aqueous medium 10 and the reactor was stirred for 1 hour at a rate of 200 rpm. Deionized water was then added to adjust the toner base particle concentration in the dispersion to 20.0%, thus yielding a toner base particle dispersion 11 in which toner base particle 2 was dispersed.

Toner Base Particle Dispersion 12 Production Example

Preliminary External Addition to Toner Base Particle 2

Using a mixer (FM-10B Henschel mixer from Nippon Coke & Engineering Co., Ltd.), toner base particle 2 and acrylic monodisperse particles (MP-1451, Soken Chemical & Engineering Co., Ltd., volume-average diameter=200 nm) were mixed for 5 minutes at 4,000 rpm to obtain a toner base particle 4, in which the acrylic monodisperse particles had been preliminarily externally added to the surface of the toner base particle 2.

200.0 parts of toner base particle 4 was added to aqueous medium 10 and the reactor was stirred for 1 hour at a rate of 200 rpm. Deionized water was then added to adjust the toner base particle concentration in the dispersion to 20.0%, thus yielding a toner base particle dispersion 12 in which toner base particle 4 was dispersed.

Toner Base Particle Dispersion 13 Production Example 15.3 parts of magnesium chloride was introduced into and dissolved in 350.0 parts of deionized water in a reactor, after which holding was carried out for 1.0 hour at 65° C. while purging with nitrogen.

Stirring was carried out at 12,000 rpm using a T.K. Homomixer (Tokushu Kika Kogyo Co., Ltd.). While maintaining the stirring, an aqueous sodium hydroxide solution of 10.8 parts of sodium hydroxide dissolved in 50.0 parts of deionized water was introduced all at once into the reactor to prepare an aqueous medium containing a dispersion stabilizer. 1.0 mol/L hydrochloric acid was introduced into the aqueous medium in the reactor to adjust the pH to 6.0 and provide aqueous medium 11.

Granulation Step

While holding the temperature of the aqueous medium at 70° C. and the stirrer rotation rate at 12,000 rpm, the polymerizable monomer composition 1 was introduced into the aqueous medium 11 and 7.0 parts of the polymerization initiator t-butyl peroxypivalate was added. Granulation was performed for 10 minutes under these conditions while maintaining 12,000 rpm with the stirrer.

Polymerization Step

The high-speed stirrer was replaced with a stirrer equipped with a propeller impeller and a polymerization reaction was run at 80° C. while stirring at 150 rpm. After the polymerization conversion had reached approximately 100%, 2.0 parts of methyl methacrylate, as polymerizable monomer for the outermost layer, and 0.1 parts of 2,2-azobis (2-methyl-N-(2-hydroxyethyl)propionamide) (VA086, Wako Pure Chemical Industries, Ltd.) dissolved in 10.0 parts of deionized water were added while maintaining the same polymerization temperature. The temperature was then raised to 90° C. and a polymerization reaction was run while heating for 3.0 hours. Deionized water was added to adjust the toner base particle concentration in the dispersion to 20.0%, thus yielding a toner base particle dispersion 13 in which toner base particle 5 was dispersed.

Toner base particle 5 had a number-average particle diameter (D1) of 5.6 μm, a weight-average particle diameter (D4) of 6.4 m, and a Tg of 57° C.

Toner Base Particle Dispersion 14 Production Example

The following materials were mixed in a reactor fitted with a condenser, stirrer, and nitrogen introduction line.

polyoxypropylene(2.2)-2,2-bis(4-hydroxyphenyl)propane 42.0 parts
ethylene glycol 22.0 parts
terephthalic acid 31.0 parts
trimellitic anhydride 3.0 parts
dibutyltin oxide 0.3 parts The system was subjected to nitrogen substitution by a pressure-reduction process, after which heating was carried out to 210° C. and a reaction was run for 5 hours while introducing nitrogen and removing the produced water. Then, while continuing to stir, the temperature was gradually raised to 230° C. under reduced pressure, and a polyester resin 2 was synthesized by reaction for an additional 3 hours. The weight-average molecular weight Mw was 8,200, and Tg was 54° C.

The following materials were mixed in a reactor fitted with a condenser, stirrer, and nitrogen introduction line.

polyoxypropylene(2.2)-2,2-bis(4-hydroxyphenyl)propane 28.0 parts
ethylene glycol 36.0 parts
terephthalic acid 31.0 parts
trimellitic anhydride 3.0 parts
dibutyltin oxide 0.3 parts The system was subjected to nitrogen substitution by a pressure-reduction process, after which heating was carried out to 210° C. and a reaction was run for 5 hours while introducing nitrogen and removing the produced water. Then, while continuing to stir, the temperature was gradually raised to 230° C. under reduced pressure, and the polyester resin 3 was synthesized by reaction for an additional 3 hours. The weight-average molecular weight Mw was 7,800, and Tg was 40° C.

The following materials were thoroughly mixed using an FM mixer (Nippon Coke & Engineering Co., Ltd.), followed by melt-kneading using a twin-screw kneader (Ikegai Ironworks Corporation) set to a temperature of 100° C.

polyester resin 1 65.0 parts
polyester resin 2 8.0 parts
polyester resin 3 12.0 parts
HNP9 (melting point: 76° C., Nippon Seiro Co., Ltd.) 5.0 parts
ethylene glycol distearate 15.0 parts
C.I. Pigment Blue 15:3 6.3 parts The resulting kneaded material was cooled and was coarsely pulverized to not greater than 1 mm using a hammer mill to yield a coarse pulverizate.

A fine pulverizate of about 5 μm was then obtained from the resulting coarse pulverizate using a Turbo Mill from Turbo Kogyo Co., Ltd., followed by cutting the fines and coarse powder using a Coanda effect-based multi-grade classifier to obtain the toner base particle 6.

Toner base particle 6 had a number-average particle diameter (D1) of 5.8 μm, a weight-average particle diameter (D4) of 7.1 μm, and a Tg of 62° C.

200.0 parts of toner base particle 6 was introduced into aqueous medium 8 and dispersion was carried out for 30 minutes at a temperature of 40° C. while rotating at 7,000 rpm using a T.K. Homomixer. Deionized water was added to adjust the toner base particle concentration in the dispersion to 20.0%, thus providing toner base particle dispersion 14.

Toner Base Particle Dispersion 15 Production Example

Toner base particle 7 was obtained proceeding as for toner base particle 1, but without using the ethylene glycol distearate. Toner base particle dispersion 15 was then obtained proceeding as for toner base particle dispersion 1.

Toner Base Particle Dispersion 16 Production Example

Toner base particle 8 was obtained proceeding as for toner base particle 1, but using 1,6-hexanediol dilaurate in place of the ethylene glycol distearate.

Toner base particle dispersion 16 was then obtained proceeding as for toner base particle dispersion 1.

Toner Base Particle Dispersion 17 Production Example

Toner base particle 9 was obtained proceeding as for toner base particle 1, but using the ester compound given by $CH_3(CH_2)_{25}CO(CH_2)_2COO(CH_2)_{25}CH_3$ in place of the ethylene glycol distearate. Toner base particle dispersion 17 was then obtained proceeding as for toner base particle dispersion 1.

TABLE 2

| Toner base | Aqueous medium | | | | | | | Toner base | Deionized water | |
|---|---|---|---|---|---|---|---|---|---|---|
| particle dispersion | Type | Deionized water | Introduced material 1 | Parts | Introduced material 2 | Parts | pH | particle Type | Introduced Material 3 | Parts |
| Toner base particle dispersion 1 | Aqueous medium 1 | 390.0 | sodium phosphate | 15.0 | calcium chloride deionized water | 9.0/ 10.0 | 6.0 | Toner base particle 1 | Deionized water | * |
| Toner base particle dispersion 2 | Aqueous medium 2 | 390.0 | sodium phosphate | 4.0 | calcium chloride/ deionized water | 2.4/ 10.0 | 6.0 | Toner base particle 1 | | |
| Toner base particle dispersion 3 | Aqueous medium 3 | 390.0 | sodiom phosphate | 5.0 | calcium chloride/ deionized water | 3.0/ 10.0 | 6.0 | Toner base particle 1 | | |
| Toner base particle dispersion 4 | Aqueous medium 4 | 390.0 | sodium phosphate | 30.0 | calcium chloride/ deionized water | 18.0/ 20.0 | 6.0 | Toner base particle | | |
| Toner base particle dispersion 5 | Aqueous medium 5 | 390.0 | sodium phosphate | 33.0 | calcium chloride/ deionized water | 19.8/ 20.0 | 6.0 | Toner base particle 1 | | |
| Toner base particle dispersion 6 | Aqueous medium 1 | 390.0 | sodium phosphate | 15.0 | calcium chloride/ deionized water | 9.0/ 10.0 | 6.0 | Toner base particle 2 | | |
| Toner base particle dispersion 7 | Aqueous medium 6 | 390.0 | sodium phosphate | 14.0 | calcium chloride/ deionized water | 9.2/ 10.0 | 6.0 | Toner base particle 3 | | |
| Toner base particle dispersion 8 | Aqueous medium 7 | 400.0 | Mirbane Resin SM-607 | 0.6 | BECKAMINE A-1 | 5.0 | 4.0 | Toner base particle | | |
| Toner base particle dispersion 9 | Aqueous medium 8 | 400.0 | thermoplastic resin dispersion 1 | 5.0 | — | — | 4.0 | Toner base particle 1 | | |
| Toner base particle dispersion 10 | Aqueous medium 9 | 400.0 | thermoplastic resin dispersion 3 | 3.0 | — | — | 4.0 | Toner base particle 1 | | |
| Toner base particle dispersion 11 | Aqueous medium 10 | 400.0 | Mirbane Resin SM-607 | 1.2 | — | — | 4.0 | Toner base particle 2 | | |
| Toner base particle dispersion 12 | Aqueous medium 10 | 400.0 | Mirbane Resin SM-607 | 1.2 | — | — | 4.0 | Toner base particle 4 | | |
| Toner base particle dispersion 13 | Aqueous medium 11 | 350.00 | magnesium chloride | 15.3 | sodium hydroxide/ deionized water | 10/8/ 50.0 | 6.0 | Toner base particle 5 | | |
| Toner base particle dispersion 14 | Aqueous medium 8 | 400.0 | thermoplastic resin dispersion 1 | 5.0 | — | — | 6.0 | Toner base particle 6 | | |

TABLE 2-continued

| Toner base | Aqueous medium | | | | | | | Toner base | Deionized water | |
|---|---|---|---|---|---|---|---|---|---|---|
| particle dispersion | Type | Deionized water | Introduced material 1 | Parts | Introduced material 2 | Parts | pH | particle Type | Introduced Material 3 | Parts |
| Toner base particle dispersion 15 | Aqueous medium 1 | 390.0 | sodium phosphate | 15.0 | calcium chloride/ deionized water | 9.0/ 10.0 | 6.0 | Toner base particle 7 | | |
| Toner base particle dispersion 16 | Aqueous medium 1 | 390.0 | sodium phosphate | 1.5.0 | calcium chloride/ deionized water | 9.0/ 10.0 | 6.0 | Toner base particle 8 | | |
| Toner base particle dispersion 17 | Aqueous medium 1 | 390.0 | sodium phosphate | 15.0 | calcium chloride deionized water | 9.0/ 10.0 | 6.0 | Toner base particle 9 | | |

*: An amount that brings the toner base particle concentration to 20.0%.

Toner Particle 1 Production Example

The following samples were weighed into a reactor and mixed using a propeller impeller.

toner base particle dispersion 1 500.0 parts thermoplastic resin dispersion 1 10.0 parts The pH of the resulting mixture was then adjusted to 7.0 using a 1 mol/L aqueous NaOH solution, and the temperature of the mixture was brought to 30° C. and holding was subsequently carried out for 1.0 hour while mixing using the propeller impeller at 200 rpm. Then, while stirring with the propeller impeller, the temperature was raised to 80° C. at a rate of 1° C./min and holding was carried out for 2 hours.

The temperature of the contents was thereafter cooled to normal temperature (approximately 25° C.); the pH was then adjusted to 1.5 with 1 mol/L hydrochloric acid and stirring was carried out for 1.0 hour; and filtration while washing with deionized water subsequently yielded a toner particle 1 having a styrene-acrylic thermoplastic resin in the outermost layer.

Toner Particles 2 to 12 and 14 to 20 Production Example

Toner particles 2 to 12 and 14 to 20 were produced proceeding as in the Toner Particle 1 Production Example, but changing the type of toner base particle dispersion and the type and amount of the thermoplastic resin dispersion in the Toner Particle 1 Production Example to that indicated in Table 3.

Toner Particle 13 Production Example

The following samples were weighed into a reactor and mixed using a propeller impeller.

toner base particle dispersion 1 500.0 parts

Mirbane Resin SM-607 methylolmelamine aqueous solution (80% solids concentration) 0.6 parts The temperature of the mixture was then brought to 30° C. and holding was subsequently carried out for 1.0 hour while mixing using a propeller impeller at 200 rpm. Then, while stirring with the propeller impeller, the temperature was raised to 80° C. at a rate of 1° C./min and holding was carried out for 2 hours. This was followed by adjusting the pH of the resulting mixture to 7.0 using a 1 mol/L aqueous NaOH solution.

The temperature of the contents was thereafter cooled to normal temperature (approximately 25° C.); the pH was then adjusted to 1.5 with 1 mol/L hydrochloric acid and stirring was carried out for 1.0 hour; and filtration while washing with deionized water subsequently yielded a toner particle 13 having a melamine thermosetting resin in the outermost layer.

Toner Particle 21 Production Example 500.0 parts of toner base particle dispersion 8 was introduced into a reactor and the temperature was raised to 80° C. at a rate of 1° C./min while stirring at 100 rpm. After the temperature had been raised, stirring was continued for 2 hours using conditions of 80° C. and 100 rpm. The pH of the resulting mixture was then adjusted to 7.0 using a 1 mol/L aqueous NaOH solution.

After the temperature of the contents had then been cooled to normal temperature (approximately 25° C.), filtration and washing were carried out five times to yield a toner particle 21 that had a thermoplastic resin and a thermosetting resin in the outermost layer.

Toner Particles 22 to 24 and 26 Production Example

Toner particles 22 to 24 and 26 were produced proceeding as in the Toner Particle 21 Production Example, but changing the type and amount of the toner base particle dispersion and the production temperature in the Toner Particle 21 Production Example to that indicated in Table 3.

Toner Particle 25 Production Example parts of toner base particle dispersion 12 was introduced into a reactor and the temperature was raised to 80° C. at a rate of 1° C./min while stirring at 100 rpm. After the temperature had been raised, stirring was continued for 2 hours using conditions of 80° C. and 100 rpm. The pH of the resulting mixture was then adjusted to 7.0 using a 1 mol/L aqueous NaOH solution. After the temperature of the contents had then been cooled to normal temperature (approximately 25° C.), filtration and washing were carried out five times to yield a toner particle 25 that had a melamine thermosetting resin in the outermost layer and that had the pre-externally-added acrylic monodisperse particles fixed to the surface.

The pre-externally-added acrylic monodisperse particles on the toner base particle surface were then removed. The melamine thermosetting resin formed in the outermost layer is tightly fixed to the toner base particle surface, while the pre-externally-added acrylic monodisperse particles are fixed to the surface by a weak force. As a consequence, the pre-externally-added particles can be removed by the application of an external force even after the outermost layer has been formed.

In this instance, toner particle 25 was first dispersed in a mixed aqueous solution including a 61.5% aqueous sucrose solution and a 10.0% neutral aqueous detergent solution for cleaning precision measurement instrumentation, including a nonionic surfactant and an anionic surfactant. A treatment of shaking 300 times in 1 minute was then performed using a shaker, after which the thusly treated toner particle 25 was dispersed in the aforementioned mixed aqueous solution and was subjected to a treatment in which ultrasound was applied for 10 minutes at an electrical output of 120 W. After the execution of this treatment, the execution of five cycles of filtration and washing yielded a toner particle 25 that had a melamine thermosetting resin in the outermost layer, and from which the acrylic monodisperse particles had been removed.

Toner Particle 27 Production Example 500.0 parts of toner base particle dispersion 14 was introduced into a reactor and the temperature was raised to 70° C. at a rate of 1° C./min while stirring at 100 rpm. Immediately after the temperature in the reactor reached 55° C. during the temperature ramp up process, the pH of toner base particle dispersion 14 was adjusted to 9.0 by adding a 1 mol/L aqueous NaOH solution to the reactor. This was followed by continuing to stir for 2 hours using conditions of 70° C. and 100 rpm.

After the temperature of the contents had then been cooled to normal temperature (25° C.), five cycles of filtration and washing were carried out to yield a toner particle 27 that had a thermoplastic resin in the outermost layer.

TABLE 3

| | Outermost layer material | | | Toner base particle dispersion | | | | Production |
|---|---|---|---|---|---|---|---|---|
| Toner particle | Type | Resin type | parts | Type | Binder resin type | Ester compound $R^1/R^2$ , $R^3$ | Parts | temperature (° C.) |
| 1 | thermoplastic resin dispersion 1 | styrene-acrylic | 10.0 | 1 | styrene-acrylic polyester | $(CH_2)_2/C_{17}H_{35}$ | 15.0 | 80 |
| 2 | thermoplastic resin dispersion 1 | styrene-acrylic | 10.0 | 2 | styrene-acrylic polyester | $(CH_2)_2/C_{17}H_{35}$ | 15.0 | 80 |
| 3 | thermoplastic resin dispersion 1 | styrene-acrylic | 10.0 | 3 | styrene-acrylic polyester | $(CH_2)_2/C_{17}H_{35}$ | 15.0 | 80 |
| 4 | thermoplastic resin dispersion 1 | styrene-acrylic | 10.0 | 4 | styrene-acrylic polyester | $(CH_2)_2/C_{17}H_{35}$ | 15.0 | 80 |
| 5 | thermoplastic resin dispersion 1 | styrene-acrylic | 10.0 | 5 | styrene-acrylic polyester | $(CH_2)_2/C_{17}H_{35}$ | 15.0 | 80 |
| 6 | thermoplastic resin dispersion 2 | styrene-acrylic | 5.0 | 1 | styrene-acrylic polyester | $(CH_2)_2/C_{17}H_{35}$ | 15.0 | 80 |
| 7 | thermoplastic resin dispersion 2 | styrene-acrylic | 4.0 | 1 | styrene-acrylic polyester | $(CH_2)_2/C_{17}H_{35}$ | 15.0 | 80 |
| | thermoplastic resin dispersion 2 | styrene-acrylic | 2.0 | 1 | styrene-acrylic polyester | $(CH_2)_2/C_{17}H_{35}$ | 15.0 | 80 |
| 9 | thermoplastic resin dispersion 2 | styrene-acrylic | 3.0 | 1 | styrene-acrylic polyester | $(CH_2)_2/C_{17}H_{35}$ | 15.0 | 80 |
| 10 | thermoplastic resin dispersion 1 | styrene-acrylic | 15.0 | 1 | styrene-acrylic polyester | $(CH_2)_2/C_{17}H_{35}$ | 15.0 | 80 |
| | thermoplastic resin dispersion 3 | styrene-acrylic | 15.0 | 1 | styrene-acrylic polyester | $(CH_2)_2/C_{17}H_{35}$ | 15.0 | 80 |
| 12 | thermoplastic resin dispersion 3 | styrene-acrylic | 25.0 | 1 | styrene-acrylic polyester | $(CH_2)_2/C_{17}H_{35}$ | 15.0 | 80 |
| 13 | methylolmelamine aqueous solution | melamine | 0.6 | 1 | styrene-acrylic polyester | $(CH_2)_2/C_{17}H_{35}$ | 15.0 | 80 |
| 14 | thermoplastic resin dispersion 1 | styrene-acrylic | 10.0 | 6 | polyester | $(CH_2)_2/C_{17}H_{35}$ | 15.0 | 80 |
| 15 | thermoplastic resin dispersion 1 | styrene-acrylic | 10.0 | 7 | styrene-acrylic polyester | $(CH_2)_2/C_{17}H_{35}$ | 15.0 | 80 |
| 16 | thermoplastic resin dispersion 1 | styrene-acrylic | 10.0 | 15 | styrene-acrylic polyester | — | — | 80 |
| 17 | thermoplastic resin dispersion 1 | styrene-acrylic | 10.0 | 16 | styrene-acrylic polyester | $(CH_2)_6/C_{11}H_{23}$ | 15.0 | 80 |
| 18 | thermoplastic resin dispersion 1 | Styrene-acrylic | 10.0 | 17 | styrene-acrylic polyester | $(CH_2)_2/C_{26}H_{53}$ | 15.0 | 80 |
| 19 | thermoplastic resin dispersion 1 | Styrene-acrylic | 10.0 | 1 | styrene-acrylic polyester | $(CH_2)_2/C_{17}H_{35}$ | 15.0 | 80 |
| 20 | thermoplastic resin dispersion 1 | Styrene-acrylic | 10.0 | 1 | styrene-acrylic polyester | $(CH_2)_2/C_{17}H_{35}$ | 15.0 | 80 |
| 21 | methylolmelamine aqueous solution<br>polyacrylamide aqueous solution | melamine<br>acrylamide | 0.6<br>5.0 | 8 | styrene-acrylic polyester | $(CH_2)_2/C_{17}H_{35}$ | 15.0 | 80 |
| 22 | thermoplastic resin dispersion 1 | styrene-acrylic | 5.0 | 9 | styrene-acrylic polyester | $(CH_2)_2/C_{17}H_{35}$ | 15.0 | 80 |
| 23 | thermoplastic resin dispersion 3 | styrene-acrylic | 3.0 | 10 | styrene-acrylic polyester | $(CH_2)_2/C_{17}H_{35}$ | 15.0 | 80 |
| 24 | methylolmelamine aqueous solution | melamine | 1.2 | 11 | polyester | $(CH_2)_2/C_{17}H_{35}$ | 15.0 | 80 |
| 25 | methylolmelamine aqueous solution | melamine | 1.2 | 12 | polyester | $(CH_2)_2/C_{17}H_{35}$ | 15.0 | 80 |
| 26 | methyl methacrylate | (meth)acrylic | 2.0 | 13 | styrene-acrylic polyester | $(CH_2)_2/C_{17}H_{35}$ | 15.0 | 80 |
| 27 | thermoplastic resin dispersion 1 | styrene-acrylic | 5.0 | 14 | polyester | $(CH_2)_2/C_{17}H_{35}$ | 15.0 | 70 |

The properties of the obtained toner particles 1 to 27 are given in Table 4.

TABLE 4

| Toner particle | status of occurrence | Concave portions: long diameter (nm) 50.0 ≤ A ≤ 200.0 | short diameter (nm) 10.0 ≤ B ≤ 70.0 | depth (nm) 0.7 × T ≤ D ≤ 1.5 × T | Number/1 $\mu m^2$ 30 ≤ n ≤ 200 | Oversized concave portions Number/1 $\mu m^2$ not more than 10 | Thickness T of outermost layer (nm) 5.0 ≤ T ≤ 100.0 |
|---|---|---|---|---|---|---|---|
| 1 | Y | Y (105.0) | Y (32.0) | Y (22.0) | Y (115) | Y (0) | Y (20.0) |
| 2 | Y | Y (102.0) | Y (26.0) | Y (23.6) | N (27) | Y (0) | Y (20.8) |
| 3 | Y | Y (86.0) | Y (18.6) | Y (19.1) | Y (30) | Y (0) | Y (20.1) |
| 4 | Y | Y (122.5) | Y (40.5) | Y (21.3) | Y (198) | Y (5) | Y (21.2) |
| 5 | Y | Y (141.8) | Y (47.4) | Y (25.0) | N (204) | Y (7) | Y (24.6) |
| 6 | Y | Y (122.5) | Y (40.5) | Y (12.6) | Y (146) | Y (8) | Y (10.8) |
| 7 | Y | Y (128.6) | Y (46.5) | Y (11.4) | Y (172) | Y (10) | Y (9.7) |
| 8 | Y | Y (112.0) | Y (37.0) | Y (5.2) | Y (116) | Y (0) | Y (4.5) |
| 9 | Y | Y (110.0) | Y (39.0) | Y (8.5) | Y (120) | Y (0) | Y (6.2) |
| 10 | Y | Y (126.8) | Y (31.2) | Y (34.5) | Y (119) | Y (0) | Y (38.0) |
| 11 | Y | Y (168.3) | Y (44.3) | Y (47.7) | Y (143) | Y (0) | Y (62.0) |
| 12 | Y | Y (192.6) | Y (61.5) | Y (70.2) | Y (187) | Y (0) | Y (98.0) |
| 13 | Y | Y (134.2) | Y (24.8) | Y (20.5) | Y (121) | Y (0) | Y (14.2) |
| 14 | Y | Y (97.0) | Y (34.0) | Y (21.6) | Y (107) | Y (0) | Y (22.0) |
| 15 | Y | Y (105.4) | Y (32.1) | Y (22.0) | Y (121) | Y (0) | Y (20.0) |
| 16 | Y | Y (108.0) | Y (34.0) | Y (21.8) | Y (118) | Y (0) | Y (21.6) |
| 17 | Y | Y (106.0) | Y (33.1) | Y (22.4) | Y (121) | Y (0) | Y (20.5) |
| 18 | Y | Y (110.8) | Y (31.0) | Y (23.2) | Y (134) | Y (0) | Y (22.0) |
| 19 | Y | Y (104.3) | Y (34.2) | Y (23.1) | Y (122) | Y (0) | Y (21.5) |
| 20 | Y | Y (103.0) | Y (32.6) | Y (22.8) | Y (126) | Y (0) | Y (21.1) |
| 21 | N | — | — | — | — | — | Y (10.4) |
| 22 | N | — | — | — | — | — | Y (21.2) |
| 23 | Y | Y (325.3) | Y (261.0) | Y (24.6) | N (8) | N (12) | Y (21.0) |
| 24 | N | — | — | — | — | — | Y (19.5) |
| 25 | Y | N (22.6) | Y (19.6) | Y (17.5) | N (25) | Y (0) | Y (16.6) |
| 26 | N | — | — | — | — | — | Y (10.6) |
| 27 | Y | N (660.4) | N (440.2) | N (120.6) | N (1) | N (19) | Y (12.8) |

In Table 4, "Y" in the cells that report the status of occurrence of concave portions indicates that concave portions were formed in the toner particle surface, and "N" in the cells that report the status of occurrence of concave portions indicates that concave portions were not formed in the toner particle surface. In cells other than this, "Y" indicates that the value is within the prescribed range, and "N" indicates that the value is not within the prescribed range.

Toner Production Example

Toner 1

The external additives indicated below were added to 100 parts of toner particle 1 and mixing was carried out for 10 minutes at a peripheral velocity of 32 m/s using an FM mixer (Nippon Coke & Engineering Co., Ltd.); toner 1 was obtained by removing the coarse particles using a mesh with an aperture of 45 μm.

hydrophobic silica with a number-average particle diameter of 12 nm
0.8 parts hydrophobic silica with a number-average particle diameter of 100 nm
0.5 parts Toners 2 to 18 and 21 to 27

Toners 2 to 18 and 21 to 27 were produced proceeding as in the Toner 1 Production Example.

Toner 19

The external additive indicated below was added to 100 parts of toner particle 19 and mixing was carried out for 10 minutes at a peripheral velocity of 32 m/s using an FM mixer (Nippon Coke & Engineering Co., Ltd.); toner 19 was obtained by removing the coarse particles using a mesh with an aperture of 45 μm.

hydrophobic silica with a number-average particle diameter of 12 nm
0.8 parts

Toner 20

The external additives indicated below were added to 100 parts of toner particle 20 and mixing was carried out for 10 minutes at a peripheral velocity of 32 m/s using an FM mixer (Nippon Coke & Engineering Co., Ltd.); toner 20 was obtained by removing the coarse particles using a mesh with an aperture of 45 μm.

hydrophobic silica with a number-average particle diameter of 12 nm
0.8 parts hydrophobic silica with a number-average particle diameter of 40 nm
0.5 parts

Examples 1 to 18 and Comparative Examples 1 to 9

The following evaluations were performed using toners 1 to 27. The results of the evaluations are given in Table 5.

The evaluation methods and evaluation criteria used in the present disclosure are described in the following.

A modified version of an LBP-712Ci (Canon, Inc.) commercial laser printer was used as the image-forming apparatus.

With regard to the modifications, the potential in charging, transfer, and so forth was made reversible through connection to an external high-voltage power source and image formation was thus made possible with a positive-charging or a negative-charging toner as produced in the present instance. The process speed was also made 210 mm/sec.

A commercial 040H (cyan) toner cartridge (Canon, Inc.) was used as the process cartridge. The product toner was removed from the interior of the cartridge; cleaning with an air blower was performed; and 165 g of a toner as described above was loaded.

The product toner was removed at each of the yellow, magenta, and black stations, and the evaluations were performed with the yellow, magenta, and black cartridges installed, but with the remaining toner amount detection mechanism inactivated.

Test of Storability in Severe Environment

For each of the obtained toners 1 to 27, approximately 100 g was introduced into a 1,000-mL plastic cup, and this was held for 24 hours in a low-temperature, low-humidity environment (15° C., 10% RH) followed by transition to a high-temperature, high-humidity environment (55° C., 95% RH) over 24 hours.

Holding in the high-temperature, high-humidity environment for 24 hours was carried out, followed by transition back to the low-temperature, low-humidity environment (15° C., 10% RH) over 24 hours. After the toner had been subjected to three cycles of this process, it was removed and inspected for aggregation. A time chart of the heat cycle is given in the FIGURE. The results of the evaluation are given in Table 5.

Evaluation Criteria

A: Aggregation is entirely absent and the state is about the same as at the beginning.

B: Some aggregative behavior is present, but this is a condition that is broken up by gently shaking the plastic cup about five times; not a particular problem.

C: Aggregative behavior is present, but this is a condition that is readily broken up with a finger.

D: Severe aggregation is produced and cannot be broken up.

Evaluation of Durability

An image with a print percentage of 1% was continuously output in a low-temperature, low-humidity environment with a temperature of 15° C. and a humidity of 10% RH. After each 500 prints, a solid image and a halftone image were output and were visually inspected for the presence/absence of the occurrence of vertical streaks caused by toner melt-adhesion to the control member, that is, the occurrence of development streaks. 20,000 prints of the image were ultimately output. The results of the evaluation are given in Table 5.

Evaluation Criteria

A: There was no occurrence of development streaks even at 20,000 prints

B: Development streaking occurred at from 18,001 prints to 20,000 prints

C: Development streaking occurred at from 16,001 prints to 18,000 prints

D: Development streaking occurred at not more than 16,000 prints

In addition, in the evaluation of the paper-feed durability, the BET retention ratio was calculated using the following formula—where $V_{ini}$ is the BET specific surface area prior to the evaluation in the paper-feed durability test and $V_{end}$ is the BET specific surface area after the 20,000-sheet paper-feed durability test—and was used to evaluate the toner durability.

$$\text{BET retention ratio (\%)} = V_{end}/V_{ini} \times 100$$

Evaluation of the Low-Temperature Fixability

The fixing unit was detached from the modified LBP-712Ci laser printer (Canon, Inc.). Using the loaded toner, an unfixed toner image (0.9 mg/cm$^2$) with a length of 2.0 cm×width of 15.0 cm was subsequently formed on image-receiving paper (Office Planner 64 g/m$^2$, Canon, Inc.) at a location 1.0 cm from the leading edge with respect to the paper feed direction. The detached fixing unit was then modified to enable adjustment of the fixation temperature and process speed. This was used to carry out a fixing test on the unfixed image.

First, with the process speed set to 210 mm/s and the fixing lineal pressure set to 27.4 kgf, and operating in a normal-temperature, normal-humidity environment (23° C., 60% RH), the low temperature-side fixing onset point was measured by carrying out fixing of the unfixed image at each temperature starting from an initial temperature of 110° C. and increasing the set temperature sequentially in 5° C. increments.

The criteria for evaluating the low-temperature fixability are given below. The results of the evaluations are given in Table 5.

This low temperature-side fixing onset point is the lowest temperature at which there are three or fewer occurrences of image exfoliation with a diameter of at least 150 μm, when the surface of the fixed image has been rubbed five times at a speed of 0.2 m/s using lens-cleaning paper (Dusper K-3) carrying a load of 4.9 kPa (50 g/cm$^2$). This image exfoliation assumes an increasing trend when a strong fixing has not been executed.

The evaluation criteria are as follows.

A: the low temperature-side fixing onset point is less than 120° C.

B: the low temperature-side fixing onset point is at least 120° C. and less than 130° C.

C: the low temperature-side fixing onset point is at least 130° C. and less than 140° C.

D: the low temperature-side fixing onset point is at least 140° C.

TABLE 5

| — | Toner No. | Storability test in severe environment | Durability *(number of prints) | Durability BET retention ratio (%) | Low temperature-side fixing onset point (° C.) |
|---|---|---|---|---|---|
| Example 1 | 1 | A | A (not occurred) | 72 | A (115) |
| Example 2 | 3 | A | C (175000) | 60 | B (120) |
| Example 3 | 4 | C | B (19000) | 64 | A (115) |
| Example 4 | 6 | B | A (not occurred) | 66 | A (115) |
| Example 5 | 7 | C | B (19000) | 64 | A (115) |
| Example 6 | 8 | B | C (17000) | 60 | A (115) |
| Example 7 | 9 | B | B (18500) | 63 | A (115) |
| Example 8 | 10 | A | A (not occurred) | 68 | A (115) |
| Example 9 | 11 | A | A (not occurred) | 70 | B (125) |
| Example 10 | 12 | A | A (not occurred) | 69 | C (135) |
| Example 11 | 13 | A | A (not occurred) | 70 | A (115) |
| Example 12 | 14 | A | A (not occurred) | 71 | A (115) |
| Example 13 | 15 | A | A (not occurred) | 72 | A (115) |
| Example 14 | 16 | A | A (not occurred) | 71 | C (130) |
| Example 15 | 17 | A | A (not occurred) | 70 | A (115) |
| Example 16 | 18 | A | A (not occurred) | 70 | B (125) |

TABLE 5-continued

| — | Toner No. | Storability test in severe environment | Durability | | Low temperature-side fixing onset point (° C.) |
|---|---|---|---|---|---|
| | | | *(number of prints) | BET retention ratio (%) | |
| Example 17 | 19 | A | C (16500) | 57 | A (115) |
| Example 18 | 20 | A | B (18500) | 63 | A (115) |
| Comparative Example 1 | 2 | D | C (16500) | 58 | D (140) |
| Comparative Example 2 | 5 | D | A (not occurred) | 68 | A (115) |
| Comparative Example 3 | 21 | A | D (13000) | 44 | D (140) |
| Comparative Example 4 | 22 | A | D (14000) | 42 | D (140) |
| Comparative Example 5 | 23 | D | D (15000) | 41 | B (120) |
| Comparative Example 6 | 24 | A | D (13500) | 44 | D (145) |
| Comparative Example 7 | 25 | A | D (14000) | 48 | D (145) |
| Comparative Example 8 | 26 | A | D (13500) | 45 | D (140) |
| Comparative Example 9 | 27 | D | D (15000) | 53 | B (125) |

In the table, "*" denotes number of prints to occurrence of development streaks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-053066, filed Mar. 24, 2020 which is hereby incorporated by reference herein in its entirety.

What is claimed is:

1. A toner, comprising:

a toner particle that comprises a toner base particle, and an outermost layer present on a surface of the toner base particle;

the toner base particle containing a binder resin; and a plurality of concave portions formed on the surface of the toner particle, wherein 30≤n≤200 when n represents a number of the concave portions per 1 $\mu m^2$ of the surface of the toner particle that satisfy formulae (1) to (3)

$$50.0 \le a \le 200.0 \quad (1)$$

$$10.0 \le b \le 70.0 \quad (2) \text{ and}$$

$$0.7 \times T \le d \le 1.5 \times T \quad (3)$$

where T (nm) is an average thickness of the outermost layer in cross section of the toner particle observed with a transmission electron microscope, a (nm) is a long diameter of each of the concave portions, b (nm) is a short diameter of each of the concave portions, and d (nm) is a depth of each of the concave portions when the concave portions on the toner particle are measured by using a scanning probe microscope from an outermost surface of the outermost layer toward a center of the toner particle, and the outermost layer comprises (i) a thermoplastic resin comprising a styrene-acrylic resin that is a polymer of at least one kind of styrenic monomer and at least one kind of (meth)acrylic monomer, or (ii) a thermosetting resin comprising a melamine resin.

2. The toner according to claim 1, wherein N is not more than 10 when N represents a number of the concave portions per 1 $\mu m^2$ of the surface of the toner particle that satisfy formulae (5) and (6)

$$250.0 < a \quad (5) \text{ and}$$

$$100.0 < b \quad (6).$$

3. The toner according to claim 1, wherein the average thickness T (nm) of the outermost layer is 5.0 to 100.0 nm.

4. The toner according to claim 1, wherein the binder resin comprises said styrene-acrylic resin.

5. The toner according to claim 1, wherein the binder resin comprises a polyester resin.

6. The toner according to claim 1, wherein the toner base particle further comprises a wax, and the wax comprises an ester compound represented by formulae (7) or (8)

(7)

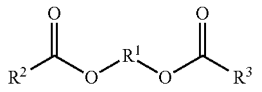

(8)

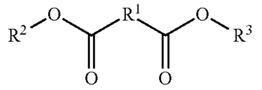

where $R^1$ represents an alkylene group having 1 to 6 carbons, and $R^2$ and $R^3$ independently represent an alkyl group having 11 to 26 carbons.

7. The toner according to claim 1, wherein the surface of the toner comprises silica particles having a number-average primary particle diameter of at least 40.0 nm.

8. The toner according to claim 1, wherein $$65 \le V_{end}/V_{ini} \times 100 \le 100$$

when $V_{ini}$ is a BET specific surface area of the toner prior to evaluation in a paper-feed durability test and $V_{end}$ is a BET specific surface area of the toner after a 20,000-paper-feed durability test.

* * * * *